US012711881B2

(12) United States Patent
Takahashi et al.

(10) Patent No.: US 12,711,881 B2
(45) Date of Patent: Aug. 18, 2026

(54) AERIAL FLOATING IMAGE DISPLAY APPARATUS

(71) Applicant: MAXELL, LTD., Kyoto (JP)

(72) Inventors: Hiroaki Takahashi, Kyoto (JP); Yusuke Uchiyama, Kyoto (JP); Koji Hirata, Kyoto (JP); Koji Fujita, Kyoto (JP); Toshinori Sugiyama, Kyoto (JP)

(73) Assignee: MAXELL, LTD., Kyoto (JP)

( * ) Notice: Subject to any disclaimer, the term of this patent is extended or adjusted under 35 U.S.C. 154(b) by 347 days.

(21) Appl. No.: 18/038,993

(22) PCT Filed: Nov. 10, 2021

(86) PCT No.: PCT/JP2021/041404
§ 371 (c)(1),
(2) Date: May 26, 2023

(87) PCT Pub. No.: WO2022/113745
PCT Pub. Date: Jun. 20, 2022

(65) Prior Publication Data
US 2024/0005825 A1 Jan. 4, 2024

(30) Foreign Application Priority Data
Nov. 30, 2020 (JP) ................................ 2020-197896

(51) Int. Cl.
*G09G 3/00* (2006.01)
*G02B 30/56* (2020.01)

(52) U.S. Cl.
CPC ............ *G09G 3/003* (2013.01); *G02B 30/56* (2020.01); *G09G 2320/0626* (2013.01); *G09G 2354/00* (2013.01); *G09G 2358/00* (2013.01); *G09G 2360/144* (2013.01)

(58) Field of Classification Search
None
See application file for complete search history.

(56) References Cited

U.S. PATENT DOCUMENTS

2016/0334990 A1* 11/2016 Beaver ................ G06F 3/04883
2018/0097960 A1* 4/2018 Ochiai .................. H04N 25/65
2019/0227489 A1 7/2019 Tokuchi
2019/0228689 A1 7/2019 Tokuchi
(Continued)

FOREIGN PATENT DOCUMENTS

JP 2008-276274 A 11/2008
JP 2016-200882 A 12/2016
(Continued)

OTHER PUBLICATIONS

International Search Report of PCT/JP2021/041404 dated Feb. 8, 2022.

*Primary Examiner* — Yi Wang
(74) *Attorney, Agent, or Firm* — MATTINGLY & MALUR, PC

(57) ABSTRACT

An aerial floating image display apparatus includes a display apparatus configured to generate an image, a retroreflector configured to reflect image light from the display apparatus, and an imager, and if a plurality of persons appear in a captured image generated by the imager, the aerial floating image display apparatus displays, as an aerial floating image, information for notifying a user of the aerial floating image display apparatus of being peeked.

20 Claims, 29 Drawing Sheets

(56) References Cited

U.S. PATENT DOCUMENTS

| | | | | |
|---|---|---|---|---|
| 2019/0235737 | A1 | 8/2019 | Kuribayashi | |
| 2020/0134239 | A1 | 4/2020 | Inagaki et al. | |
| 2021/0064146 | A1 * | 3/2021 | Stern | G06F 3/0346 |
| 2023/0148045 | A1 * | 5/2023 | Shimose | G02B 30/27 353/8 |

FOREIGN PATENT DOCUMENTS

| | | | | | |
|---|---|---|---|---|---|
| JP | 2018-055320 | A | | 4/2018 | |
| JP | 2018-084775 | A | | 5/2018 | |
| JP | 2018-194998 | A | | 12/2018 | |
| JP | 2019-040096 | A | | 3/2019 | |
| JP | 2019-128722 | A | | 8/2019 | |
| JP | 2019-128724 | A | | 8/2019 | |
| JP | 2019179401 | A | * | 10/2019 | |
| JP | 2020-067838 | A | | 4/2020 | |
| JP | 2020-183997 | A | | 11/2020 | |
| WO | WO-2007004536 | A1 | * | 1/2007 | G06K 9/00221 |
| WO | 2018/003860 | A1 | | 1/2018 | |

* cited by examiner (A)

(B)

(A)

(B)

200 : USER
3
12
11
13
1
21
100
101
2

200 : USER
3
100
101
12
11
13
1
2
21

FIG. 15

EMITTED LIGHT
1
11
54
β14
α14
Lr14
Lc14
α8
Lr8
172
β8
Lc8
172a
172b
30
α1
Lr1
Lc1
13
173
18b
β1
171
18a
16
21
15
102
14a,14b (a)

<<CAUTION>>
BEING PEEKED

IMG11

(b)

MOVE TO MENU SCREEN

YES NO

IMG12

(a)
IMG21
<<CAUTION>>
STEP AWAY FROM SCREEN
(d)
IMG24
....
(b)
IMG22
<<CAUTION>>
OPERATION IS
UNDETECTABLE
(e)
IMG31
<<CAUTION>>
○
SECONDS LEFT FOR MOVING
TO MENU SCREEN
(c)
IMG23
<<CAUTION>>
INACCURATE
TOUCH POSITION
(f)
IMG32
MOVE TO MENU SCREEN
YES
NO (a)

(b)

AERIAL FLOATING IMAGE DISPLAY APPARATUS

TECHNICAL FIELD

The present invention relates to an aerial floating image display apparatus.

BACKGROUND ART

A conventional technique is disclosed in Japanese Unexamined Patent Application Publication No. 2019-128722 (Patent Document 1). This publication describes "reducing erroneous detection of an operation on an image formed in the air".

RELATED ART DOCUMENTS

Patent Documents

Patent Document 1: Japanese Unexamined Patent Application Publication No. 2019-128722

SUMMARY OF THE INVENTION

Problems to be Solved by the Invention

However, if another person is present behind the user who performs a touch operation or the like on an aerial floating image, the person may peek at the displayed information. As a result, the safety of the aerial floating image display apparatus is lowered.

Therefore, an object of the present invention is to provide an aerial floating image display apparatus capable of improving the safety for an aerial floating image.

Means for Solving the Problems

In order to solve the problem described above, for example, the configuration described in claims is adopted. Although this application includes a plurality of means for solving the problem, one example thereof can be presented as follows. That is, an aerial floating image display apparatus includes: a display apparatus configured to generate an image; a retroreflector configured to reflect image light from the display apparatus; and an imager, and if a plurality of persons appear in a captured image generated by the imager, the aerial floating image display apparatus displays, as an aerial floating image, information for notifying a user of the aerial floating image display apparatus of being peeked.

Effects of the Invention

According to the present invention, it is possible to realize a more favorable aerial floating image display apparatus. Other problems, configurations, and effects will become apparent in the following description of embodiments.

BRIEF DESCRIPTIONS OF THE DRAWINGS

FIG. 15 is a layout drawing showing a main part of the aerial floating image display apparatus according to an embodiment of the present invention;

FIG. 21 is an explanatory diagram for describing diffusion characteristics of the display apparatus;

FIG. 28 is a diagram showing examples of a display image for notifying a user when another person is standing behind the user;

DETAILED DESCRIPTION OF PREFERRED EMBODIMENTS

Figure 1:
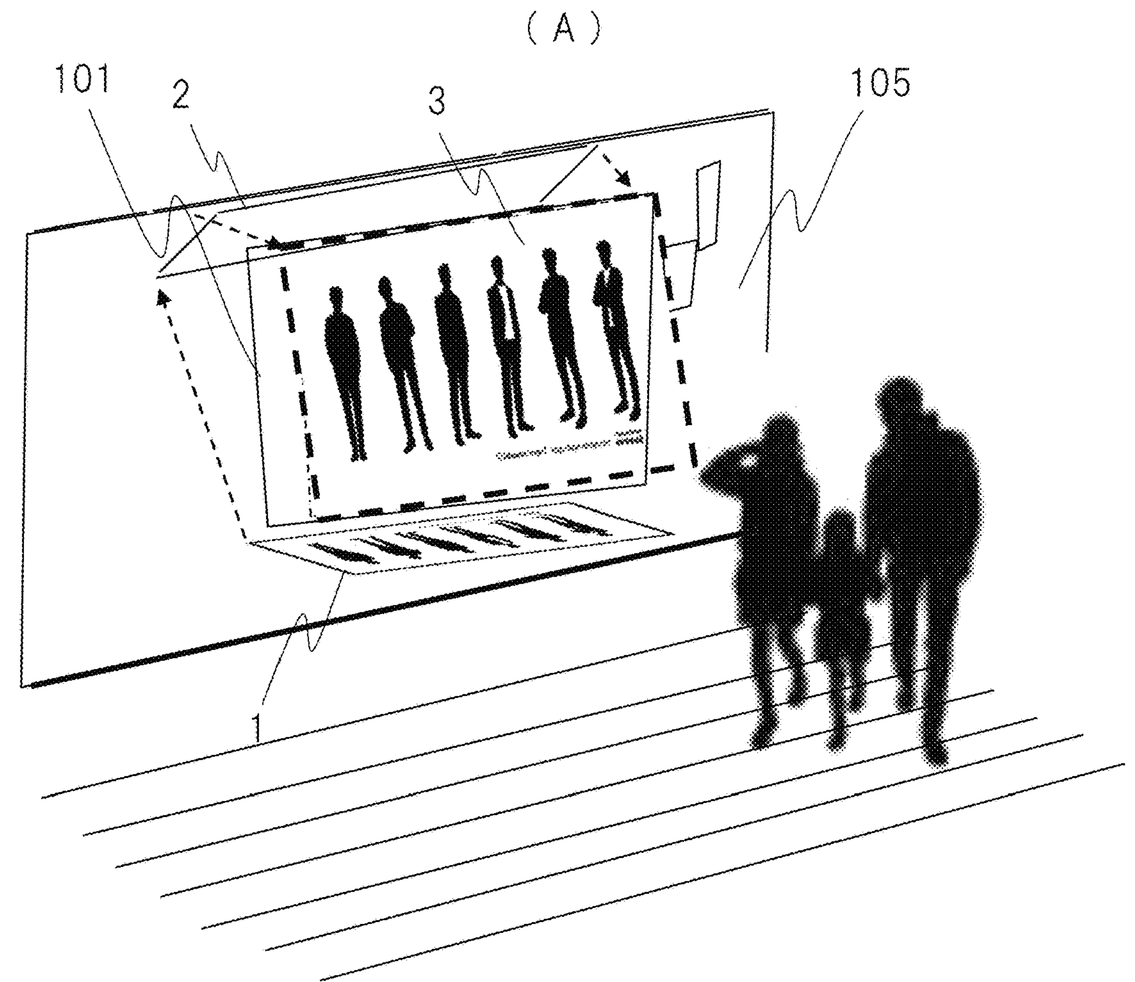
FIG. 1 is a diagram showing an example of usage form of an aerial floating image display apparatus according to an embodiment of the present invention.
Figure 1:
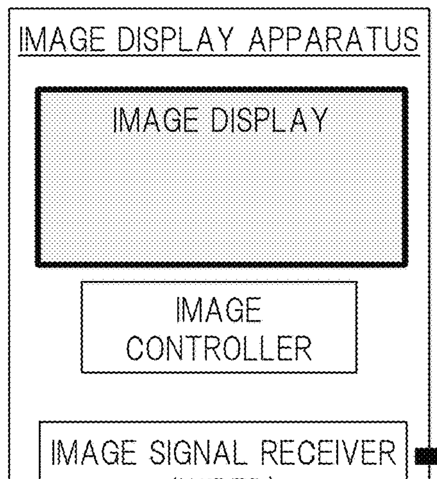
Figure 1:
Figure 1:
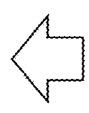

Hereinafter, embodiments of the present invention will be described in detail with reference to the drawings. Note that the present invention is not limited to the described embodiments, and various changes and modifications can be made by those skilled in the art within the scope of the technical idea disclosed in this specification. In all the drawings for describing the present invention, components having the same function are denoted by the same reference characters, and description thereof is not repeated in some cases.

The following embodiments relate to an aerial floating image display apparatus capable of transmitting an image by image light from an image light emitting source through a transparent member partitioning a space such as glass and displaying the image as an aerial floating image outside the transparent member.

According to the following embodiments, for example, it is possible to realize an aerial floating image display apparatus suitable for an ATM of a bank, a ticket vending machine of a station, a digital signage, or the like. For example, at present, though a touch panel is generally used in an ATM of a bank, a ticket vending machine of a station, or the like, it becomes possible to display high-resolution image information above a transparent glass surface or a light-transmitting plate material in a state of floating in space. At this time, by making the divergence angle of the emitted image light small, that is, an acute angle, and further aligning the image light with a specific polarized wave, only the normal reflected light is efficiently reflected to the retroreflector, so that the light utilization efficiency can be increased, the ghost image generated in addition to the main aerial floating image, which has been a problem in the conventional retroreflective system, can be suppressed, and a clear aerial floating image can be obtained. Also, with the apparatus including the light source of the present embodiment, it is possible to provide a novel and highly usable aerial floating image display apparatus (aerial floating image display system) capable of significantly reducing power consumption. Further, it is also possible to provide an aerial floating image display apparatus for a vehicle capable of displaying a so-called unidirectional aerial floating image which can be visually recognized inside and/or outside the vehicle.

Figure 23:
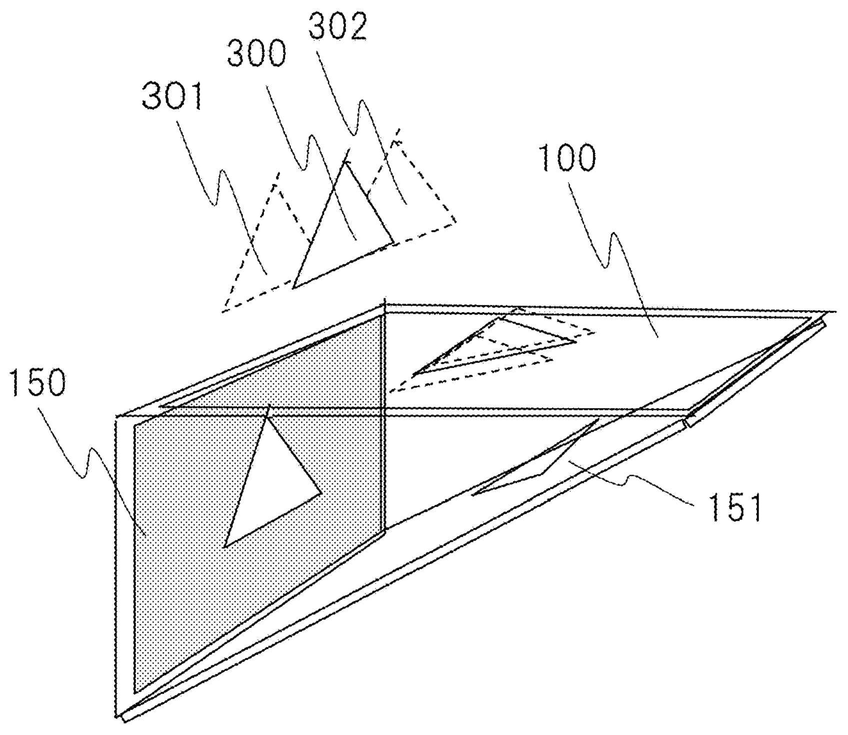
FIG. 23 is an explanatory diagram for describing a principle of generation of a ghost image.
Figure 24:
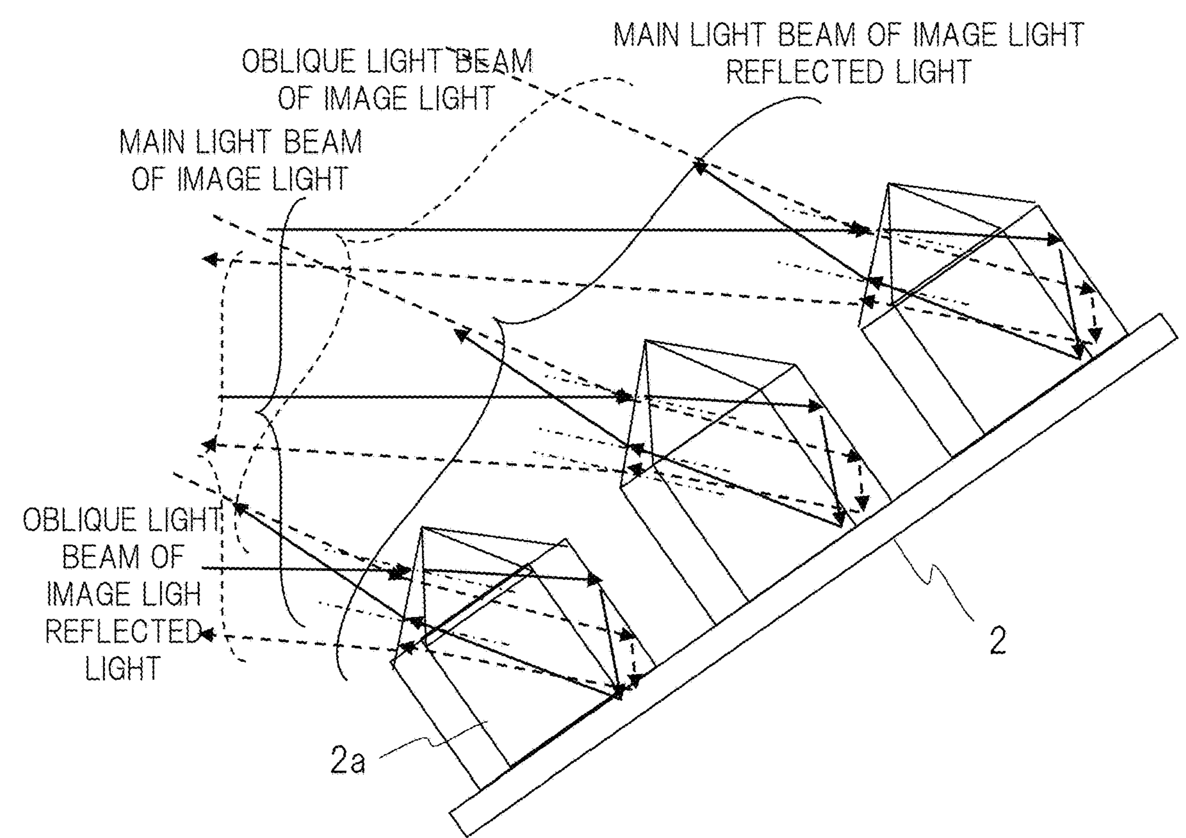
FIG. 24 is an explanatory diagram for describing a principle of generation of a ghost image in a conventional technique.

On the other hand, in the conventional technique, an organic EL panel or a liquid crystal panel is combined as a high-resolution color display image source 150 with a retroreflector 151. In the conventional technique, since image light is diffused at a wide angle, ghost images 301 and 302 are generated by the image light obliquely entering a retroreflector **2*a* as shown in FIG. 24 in addition to the reflection light normally reflected by the retroreflector 151, thereby deteriorating the image quality of the aerial floating image. Further, as shown in FIG. 23, multiple images such as the first ghost image 301 and the second ghost image 302 are generated in addition to a normal aerial floating image 300**. Therefore, the ghost image corresponding to the same aerial floating image is monitored by a person other than an observer, and there is a significant problem in terms of security.

<Example of Aerial Floating Image Display Apparatus (1)>

Figure 32:
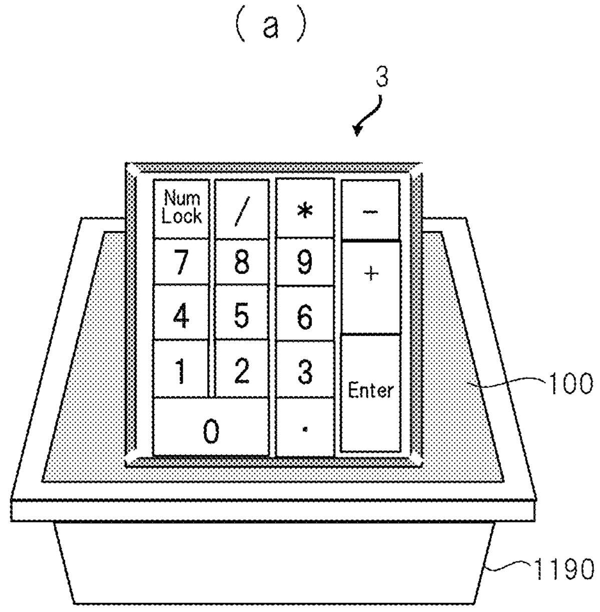
FIG. 32 is a diagram showing examples of an image displayed as an aerial floating image.
Figure 32:
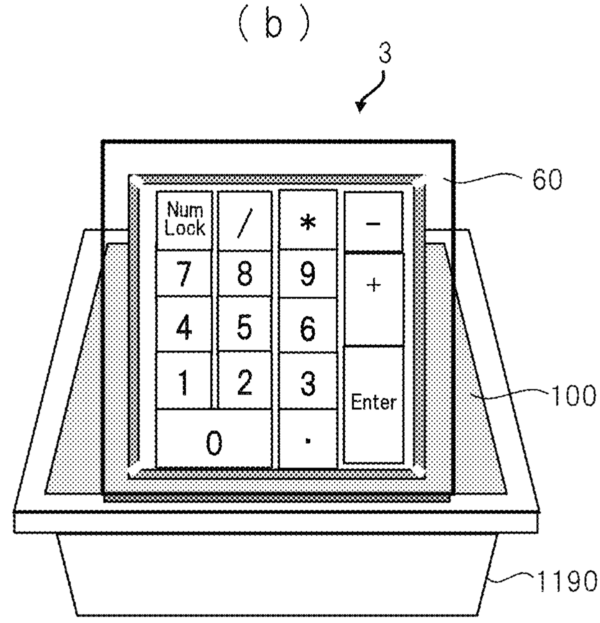

FIG. 1 and FIG. 32 are diagrams showing an example of usage form of an aerial floating image display apparatus according to an embodiment of the present invention, and are diagrams showing an entire configuration of the aerial floating image display apparatus according to the present embodiment. For example, FIG. 32 is a diagram showing examples of an image displayed as an aerial floating image. FIG. 32(*a*) shows a keypad for inputting numbers and calculation formulas as an aerial floating image 3. Note that the image displayed as an aerial floating image is not limited thereto, but may be, for example, various buttons used as a user interface for an ATM of a bank, a keyboard used in a personal computer or the like, or selection buttons for selecting products or the like.

A transparent structural member 60 shown in FIG. 32(*b*) is provided to make it easy for an observer to recognize the position of the aerial floating image 3.

Although a specific configuration of the aerial floating image display apparatus will be described in detail with reference to FIG. 2 and the like, light of a specific polarized wave with narrow-angle directional characteristics is emitted from a display apparatus 1 as an image light flux, once enters a retroreflector 2, is retroreflected and passes through a transparent member 100 (glass or the like), thereby forming a spatial image (aerial floating image 3) which is a real image on the outside of the glass surface.

In a store or the like, a space is partitioned by a show window (referred to also as "window glass") 105 which is a translucent member such as glass. With the aerial floating image display apparatus of the present embodiment, the floating image can be displayed in one direction to the outside and/or the inside of the store (space) through such a transparent member.

In FIG. 1(A), the inner side of the window glass 105 (the inside of the store) is shown in the depth direction, and the outer side thereof (e.g., a sidewalk) is shown on the front side. On the other hand, it is also possible to form a spatial image at a desired position in the store by providing a reflector configured to reflect a specific polarized wave on the window glass 105.

FIG. 1(B) is a schematic block diagram showing a configuration of an aerial floating image display apparatus 1000 described above. The aerial floating image display apparatus 1000 includes an image display configured to display an original image of a spatial image, an image controller configured to convert an input image in accordance with the resolution of a panel, and an image signal receiver configured to receive an image signal. The image signal receiver is configured to handle signals input via a wired communication such as HDMI (High-Definition Multimedia Interface) input and signals input via a wireless communication such as Wi-Fi (Wireless Fidelity), can function independently as an image receiver/display, and can also display image information from a tablet, a smartphone, and the like. Further, if a stick PC or the like is connected, it can be provided with the capability of calculation processing, image analysis processing, and the like.

Figure 2:
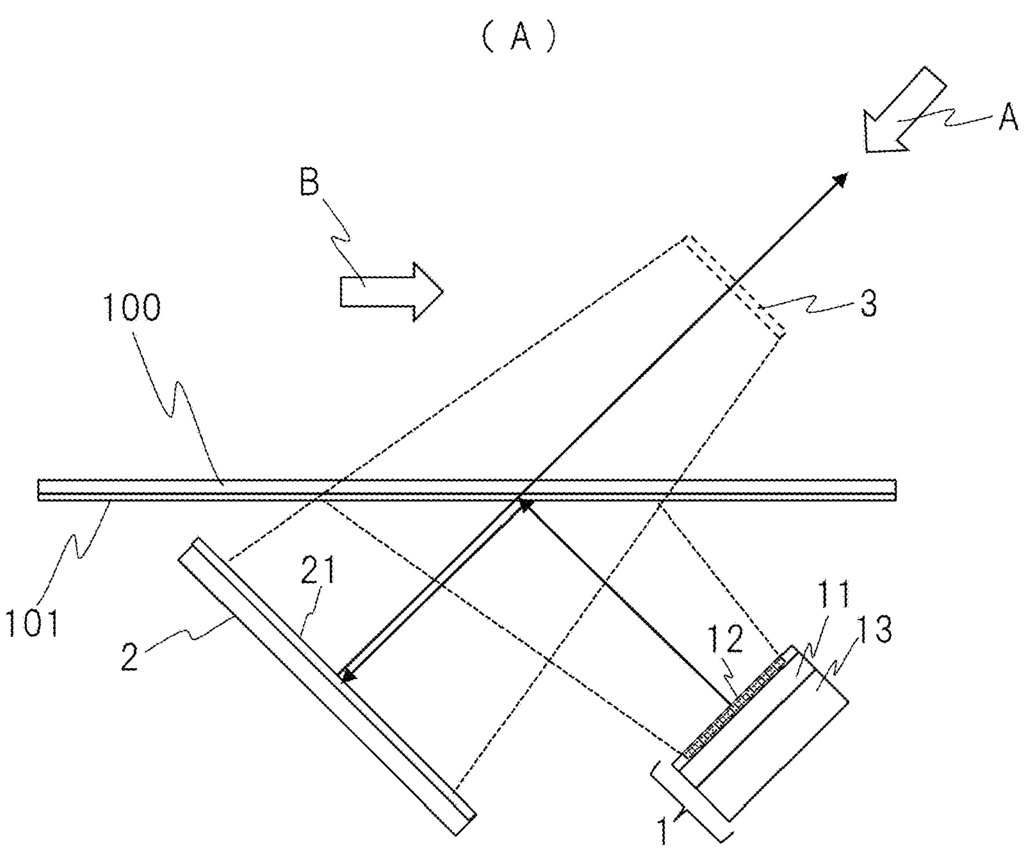
FIG. 2 is a diagram showing an example of a configuration of the main part and a configuration of a retroreflection portion of the aerial floating image display apparatus according to an embodiment of the present invention.
Figure 2:
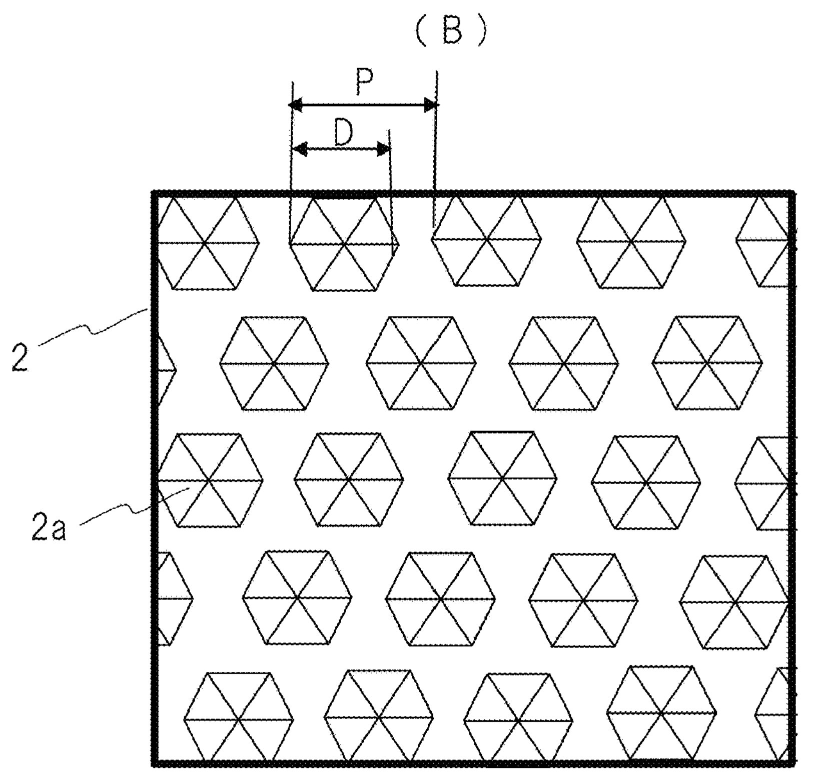

FIG. 2 is a diagram showing an example of a configuration of the main part and a configuration of a retroreflection portion of the aerial floating image display apparatus according to an embodiment of the present invention. The configuration of the aerial floating image display apparatus will be described more specifically with reference to FIG. 2. As shown in FIG. 2(A), the display apparatus 1 which diverges image light of a specific polarized wave at a narrow angle is provided in the oblique direction of the transparent member 100 such as glass. The display apparatus 1 includes a liquid crystal display panel 11 and a light source apparatus 13 configured to generate light of a specific polarized wave having narrow-angle diffusion characteristics.

The image light of the specific polarized wave from the display apparatus 1 is reflected by a polarization separator 101 having a film selectively reflecting the image light of the specific polarized wave provided on the transparent member 100 (in the drawing, the polarization separator 101 is formed in a sheet shape and is adhered to the transparent member 100), and enters the retroreflector 2. A λ/4 plate 21 is provided on the image light incident surface of the retroreflector. The image light passes through the λ/4 plate 21 twice, that is, when the image light enters the retroreflector and when the image light is emitted from the retroreflector, whereby the image light is subjected to polarization conversion from the specific polarized wave to the other polarized wave. Here, since the polarization separator 101 which selectively reflects the image light of the specific polarized wave has a property of transmitting the polarized light of the other polarized wave subjected to the polarization conversion, the image light of the specific polarized wave after the polarization conversion transmits through the polarization separator 101. The image light that has transmitted through the polarization separator 101 forms the aerial floating image 3, which is a real image, on the outside of the transparent member 100.

Note that the light that forms the aerial floating image 3 is a set of light beams converging from the retroreflector 2 to the optical image of the aerial floating image 3, and these light beams go straight even after passing through the optical image of the aerial floating image 3. Therefore, the aerial floating image 3 is an image having high directivity, unlike diffused image light formed on a screen by a general projector or the like. Therefore, in the configuration of FIG. 2, when the user visually recognizes the aerial floating image 3 from the direction of an arrow A, the aerial floating image 3 is visually recognized as a bright image. However, when another person visually recognizes the image from the direction of an arrow B, the aerial floating image 3 cannot be visually recognized as an image at all. These characteristics are very suitable for use in a system that displays an image requiring high security or a highly confidential image that is desired to be kept secret from a person facing the user.

Note that, depending on the performance of the retroreflector 2, the polarization axes of the image light after reflection are not aligned in some cases. In this case, a part of the image light whose polarization axes are not aligned is reflected by the polarization separator 101 described above and returns to the display apparatus 1. This light is sometimes reflected again on the image display surface of the liquid crystal display panel 11 constituting the display apparatus 1, so that a ghost image is generated and the image quality of the aerial floating image is deteriorated in some cases. Therefore, in the present embodiment, an absorptive polarizing plate 12 is provided on the image display surface of the display apparatus 1. The image light emitted from the display apparatus 1 is transmitted through the absorptive polarizing plate 12, and the reflected light returning from the polarization separator 101 is absorbed by the absorptive polarizing plate 12, whereby the re-reflection described above can be suppressed. Thus, it is possible to prevent deterioration in image quality due to a ghost image of an aerial floating image.

The polarization separator 101 described above may be formed of, for example, a reflective polarizing plate or a metal multilayer film that reflects a specific polarized wave.

Then, FIG. 2(B) shows a surface shape of a retroreflector manufactured by Nippon Carbide Industries Co., Inc. used in this study as the typical retroreflector 2. The light beam that enters regularly arranged hexagonal columns is reflected by the wall surfaces and bottom surfaces of the hexagonal columns and emitted as retroreflected light in a direction corresponding to the incident light, and an aerial floating image which is a real image is displayed based on the image displayed on the display apparatus 1. The resolution of the aerial floating image largely depends on the outer shape D and pitch P of the retroreflection portions of the retroreflector 2 shown in FIG. 2(B), in addition to the resolution of the liquid crystal display panel 11. For example, when a 7-inch WUXGA (1920×1200 pixels) liquid crystal display panel is used, even if one pixel (one triplet) is about 80 μm, one pixel of the aerial floating image is about 300 μm if the diameter D of the retroreflection portion is 240 μm and the pitch is 300 μm, for example. Therefore, the effective resolution of the aerial floating image is reduced to about ⅓. Therefore, in order to make the resolution of the aerial floating image equal to the resolution of the display apparatus 1, it is desired that the diameter and the pitch of the retroreflection portions are close to one pixel of the liquid crystal display panel. On the other hand, in order to suppress the occurrence of moire caused by the retroreflector and the pixels of the liquid crystal display panel, it is preferable to design each pitch ratio so as not to be an integral multiple of one pixel. Further, the shape is preferably arranged such that any one side of the retroreflection portion does not overlap with any one side of one pixel of the liquid crystal display panel.

On the other hand, in order to manufacture the retroreflector at a low cost, the retroreflector may be molded by using the roll press method. Specifically, this is a method of aligning retroreflection portions and shaping the retroreflection portions on a film, in which the retroreflector 2 having a desired shape is obtained by forming a reverse shape of the shape to be shaped on a roll surface, applying an ultraviolet curable resin on a fixing base material, shaping a necessary shape by passing the resin between rolls, and curing the resin by irradiation with ultraviolet rays.

<<Method of Installing Aerial Floating Image Display Apparatus>>

Figure 3A:
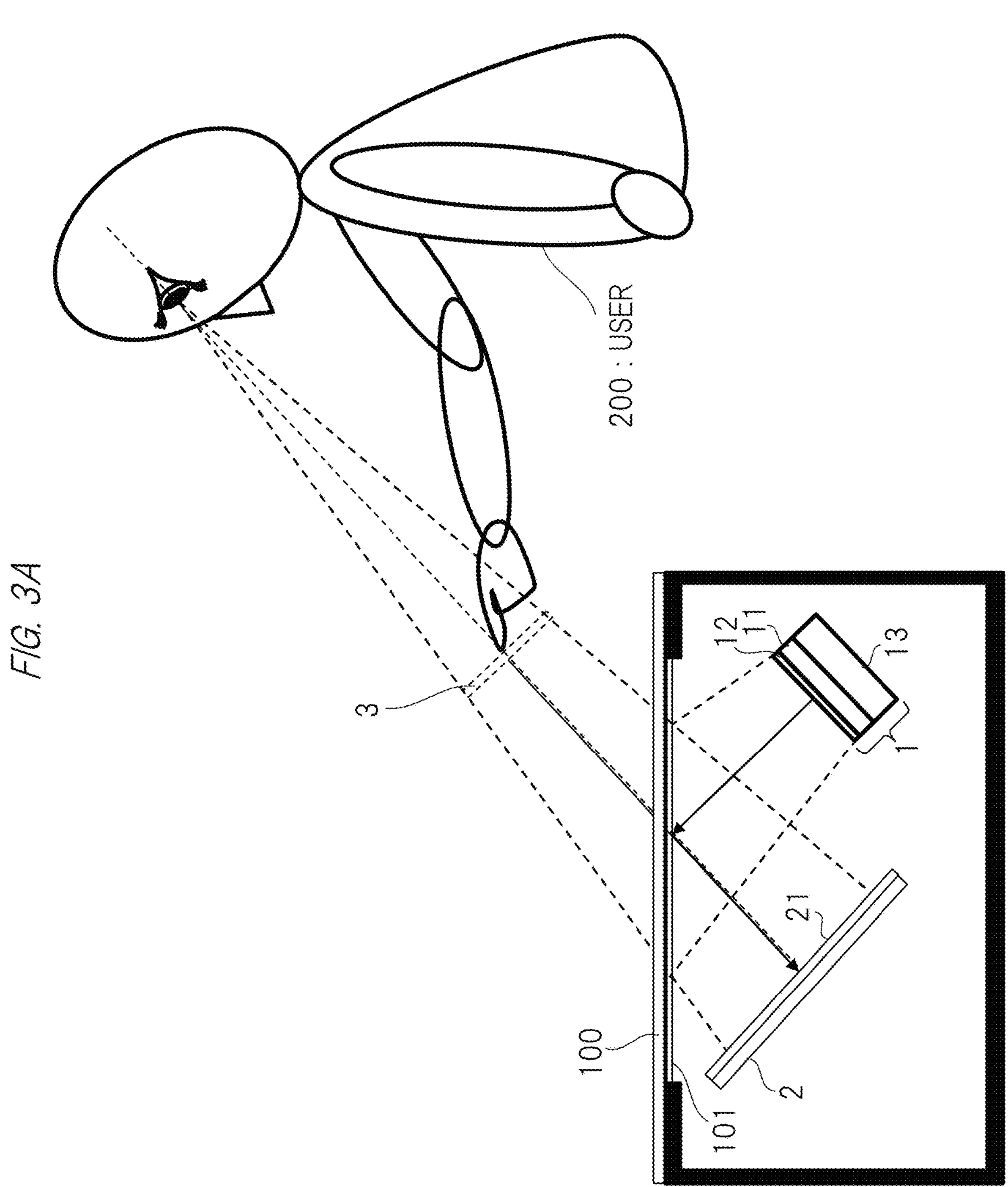
FIG. 3A is a diagram showing an example of a method of installing the aerial floating image display apparatus.

Next, a method of installing the aerial floating image display apparatus will be described. The installation method of the aerial floating image display apparatus can be freely changed according to the usage form. FIG. 3A is a diagram showing an example of the method of installing the aerial floating image display apparatus. The aerial floating image display apparatus shown in FIG. 3A is installed horizontally such that the surface on the side on which the aerial floating image 3 is formed faces upward. In other words, in FIG. 3A, the aerial floating image display apparatus is installed such that the transparent member 100 faces upward, and the aerial floating image 3 is formed above the aerial floating image display apparatus.

Figure 3B:
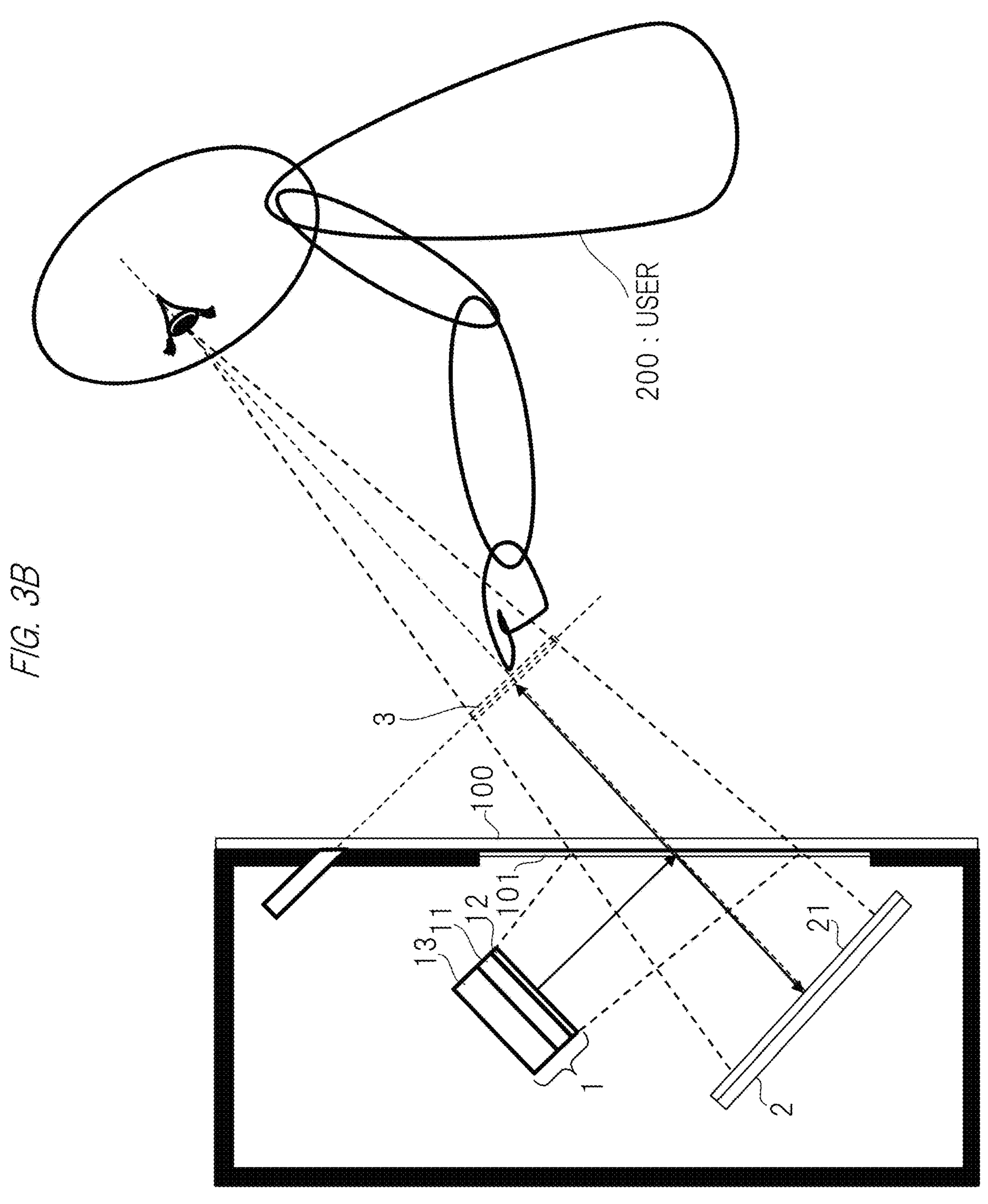
FIG. 3B is a diagram showing another example of a method of installing the aerial floating image display apparatus.

FIG. 3B is a diagram showing another example of the method of installing the aerial floating image display apparatus. The aerial floating image display apparatus shown in FIG. 3B is installed vertically such that the surface on the side on which the aerial floating image 3 is formed faces sideward (toward a user 200). In other words, in FIG. 3B, the aerial floating image display apparatus is installed such that the transparent member 100 faces sideward, and the aerial floating image 3 is formed sideward with respect to the aerial floating image display apparatus (toward the user 200).

<<Configuration of Aerial Floating Image Display Apparatus>>

Figure 3C:
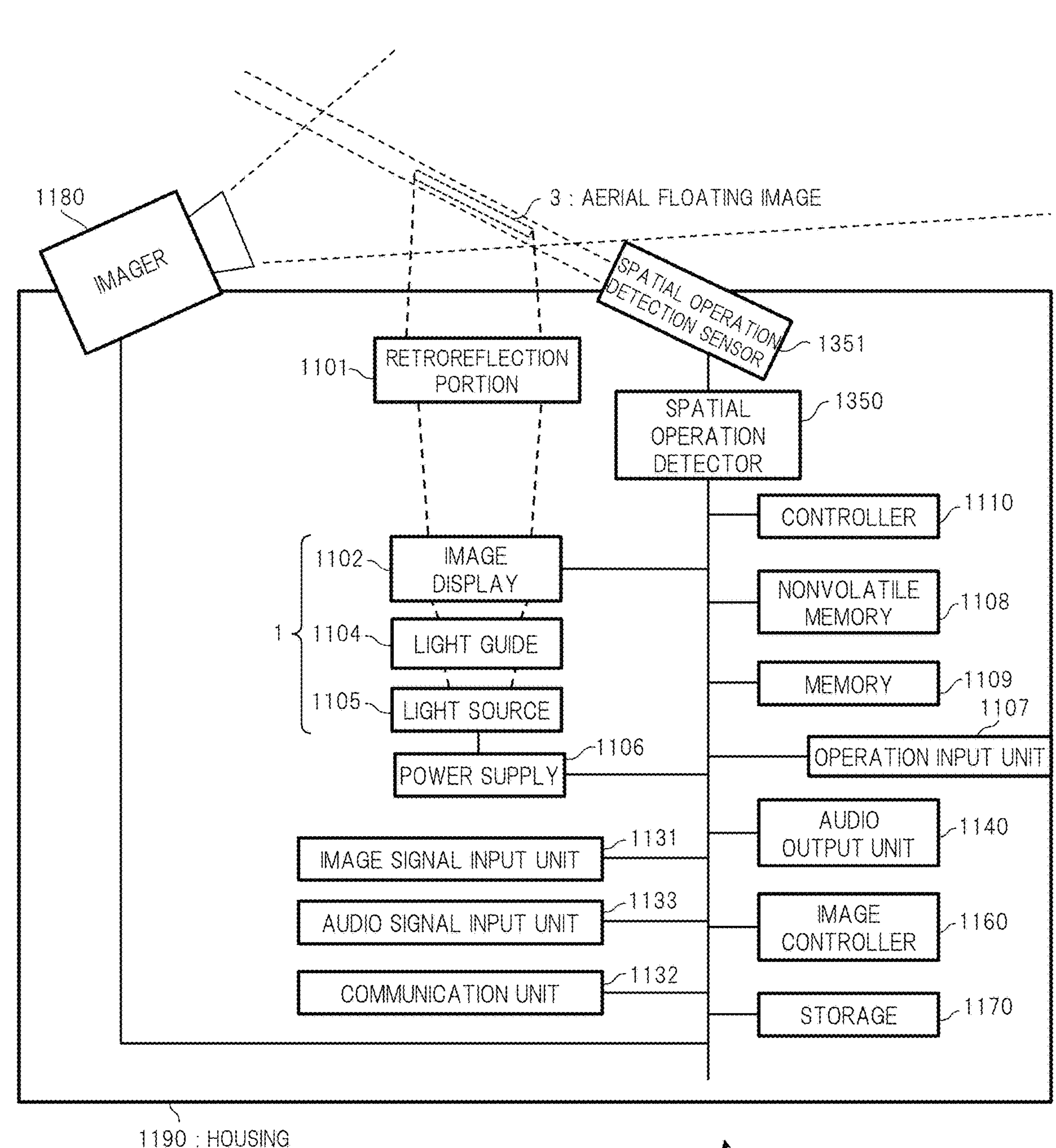
FIG. 3C is a diagram showing a configuration example of the aerial floating image display apparatus.

Next, the configuration of the aerial floating image display apparatus 1000 will be described. FIG. 3C is a block diagram showing an example of an internal configuration of the aerial floating image display apparatus 1000.

The aerial floating image display apparatus 1000 includes a retroreflection portion 1101, an image display 1102, a light guide 1104, a light source 1105, a power supply 1106, an operation input unit 1107, a nonvolatile memory 1108, a memory 1109, a controller 1110, an image signal input unit 1131, an audio signal input unit 1133, a communication unit 1132, a spatial operation detection sensor 1351, a spatial operation detector 1350, an audio output unit 1140, an image controller 1160, a storage 1170, an imager 1180, and the like.

Each component of the aerial floating image display apparatus 1000 is accommodated in a housing 1190. Note that the imager 1180 and the spatial operation detection sensor 1351 shown in FIG. 3C may be provided outside the housing 1190.

The retroreflection portion 1101 in FIG. 3C corresponds to the retroreflector 2 in FIG. 2. The retroreflection portion 1101 retroreflects the light modulated by the image display 1102. Of the reflected light from the retroreflection portion 1101, the light output to the outside of the aerial floating image display apparatus 1000 forms the aerial floating image 3.

The image display 1102 in FIG. 3C corresponds to the liquid crystal display panel 11 in FIG. 2. The light source 1105 in FIG. 3C corresponds to the light source apparatus 13 in FIG. 2. The image display 1102, the light guide 1104, and the light source 1105 in FIG. 3C correspond to the display apparatus 1 in FIG. 2.

The image display 1102 is a display that generates an image by modulating transmitted light based on an image signal input under the control of the image controller 1160 to be described below. The image display 1102 corresponds to the liquid crystal display panel 11 in FIG. 2. As the image display 1102, for example, a transmissive liquid crystal panel is used. Alternatively, as the image display 1102, for example, a reflective liquid crystal panel using a method of modulating reflected light, a DMD (Digital Micromirror Device: registered trademark) panel, or the like may be used.

The light source 1105 generates light for the image display 1102, and is a solid-state light source such as an LED light source or a laser light source. The power supply 1106 converts an AC current input from the outside into a DC current, and supplies power to the light source 1105. Further, the power supply 1106 supplies a necessary DC current to each unit in the aerial floating image display apparatus 1000.

The light guide 1104 guides the light generated by the light source 1105 and irradiates the image display 1102 with the light. A combination of the light guide 1104 and the light source 1105 may be referred to also as a backlight of the image display 1102. Various configurations are possible as the combination of the light guide 1104 and the light source 1105. A specific configuration example of the combination of the light guide 1104 and the light source 1105 will be described later in detail.

The spatial operation detection sensor 1351 is a sensor that detects an operation on the aerial floating image 3 by a finger of the user 200. For example, the spatial operation detection sensor 1351 senses a range superimposing on the entire display range of the aerial floating image 3. Note that the spatial operation detection sensor 1351 may sense only a range superimposing on at least a part of the display range of the aerial floating image 3.

Specific examples of the spatial operation detection sensor 1351 include a distance sensor using invisible light such as infrared light, an invisible light laser, an ultrasonic wave, or the like. Also, the spatial operation detection sensor 1351 may be configured to be able to detect coordinates on a two-dimensional plane by combining a plurality of sensors. The spatial operation detection sensor 1351 may be composed of a ToF (Time of Flight) type LiDAR (Light Detection and Ranging) or an image sensor.

The spatial operation detection sensor 1351 is only required to perform sensing for detecting a touch operation or the like on an object displayed as the aerial floating image 3 by a finger of the user. Such sensing can be performed by using an existing technique.

The spatial operation detector 1350 acquires a sensing signal from the spatial operation detection sensor 1351, and determines whether or not the finger of the user 200 has touched an object in the aerial floating image 3 and calculates the position (touch position) where the finger of the user 200 has touched the object, based on the sensing signal. The spatial operation detector 1350 is composed of, for example, a circuit such as a FPGA (Field Programmable Gate Array). Also, a part of the functions of the spatial operation detector 1350 may be implemented by software, for example, by a program for spatial operation detection executed by the controller 1110.

The spatial operation detection sensor 1351 and the spatial operation detector 1350 may be built in the aerial floating image display apparatus 1000, or may be provided outside separately from the aerial floating image display apparatus 1000. When provided separately from the aerial floating image display apparatus 1000, the spatial operation detection sensor 1351 and the spatial operation detector 1350 are configured to be able to transmit information and signals to the aerial floating image display apparatus 1000 via a wired or wireless communication connection path or image signal transmission path.

Also, the spatial operation detection sensor 1351 and the spatial operation detector 1350 may be provided separately. Thereby, it is possible to construct a system in which the aerial floating image display apparatus 1000 without the spatial operation detection function is provided as a main body and only the spatial operation detection function can be added as an option. Further, the configuration in which only the spatial operation detection sensor 1351 is provided separately and the spatial operation detector 1350 is built in the aerial floating image display apparatus 1000 is also possible. In a case such as when it is desired to arrange the spatial operation detection sensor 1351 more freely with respect to the installation position of the aerial floating image display apparatus 1000, the configuration in which only the spatial operation detection sensor 1351 is provided separately is advantageous.

The imager 1180 is a camera having an image sensor, and is configured to image the space near the aerial floating image 3 and/or the face, arm, finger, and the like of the user 200. A plurality of imagers 1180 may be provided. By using a plurality of imagers 1180 or by using an imager with a depth sensor, it is possible to assist the spatial operation detector 1350 in the detection processing of the touch operation on the aerial floating image 3 by the user 200.

For example, when the spatial operation detection sensor 1351 is configured as an object intrusion sensor that detects whether or not an object has intruded a plane (intrusion detection plane) including the display surface of the aerial floating image 3, the spatial operation detection sensor 1351 may not be able to detect information indicating how far an object (e.g., a finger of the user) that has not intruded the intrusion detection plane is away from the intrusion detection plane or how close the object is to the intrusion detection plane.

In such a case, it is possible to calculate the distance between the object and the intrusion detection plane by using information such as depth calculation information of the object based on the captured images of the plurality of imagers 1180 or depth information of the object by the depth sensor. These pieces of information and various kinds of information such as the distance between the object and the intrusion detection plane are used for various kinds of display control for the aerial floating image 3.

Alternatively, the spatial operation detector 1350 may detect a touch operation on the aerial floating image 3 by the user 200 based on the image captured by the imager 1180 without using the spatial operation detection sensor 1351.

Further, the imager 1180 may capture an image of the face of the user 200 who operates the aerial floating image 3, and the controller 1110 may perform the identification processing of the user 200. Also, in order to determine whether or not another person is standing around or behind the user 200 who operates the aerial floating image 3 and the person is peeking at the operation of the user 200 on the aerial floating image 3, the imager 1180 may capture an image of a range including the user 200 who operates the aerial floating image 3 and the surrounding region of the user 200.

The operation input unit 1107 is, for example, an operation button or a light receiver of a remote controller, and receives an input of a signal regarding an operation different from the spatial operation (touch operation) by the user 200. The operation input unit 1107 may be used by, for example, an administrator to operate the aerial floating image display apparatus 1000 apart from the above-described user 200 who performs the touch operation on the aerial floating image 3.

The image signal input unit 1131 is connected to an external image output device and receives an input of video data. The audio signal input unit 1133 is connected to an external audio output device and receives an input of audio data. The audio output unit 1140 can output audio based on the audio data input to the audio signal input unit 1133. Also, the audio output unit 1140 may output a built-in operation sound or an error warning sound.

The nonvolatile memory 1108 stores various kinds of data used in the aerial floating image display apparatus 1000. The data stored in the nonvolatile memory 1108 include, for example, data for various operations to be displayed on the aerial floating image 3, display icons, data of objects to be operated by user, layout information, and the like. The memory 1109 stores video data to be displayed as the aerial floating image 3, data for controlling the apparatus, and the like.

The controller 1110 controls the operation of each unit connected thereto. Also, the controller 1110 may perform arithmetic operation based on information acquired from each unit in the aerial floating image display apparatus 1000 in cooperation with a program stored in the memory 1109. The communication unit 1132 communicates with an external device, an external server, or the like via a wired or wireless interface. Various kinds of data such as video data, image data, and audio data are transmitted and received through communication via the communication unit 1132.

The storage 1170 is a storage device that records various kinds of information, for example, various kinds of data such as video data, image data, and audio data. In the storage 1170, for example, various kinds of information, for example, various kinds of data such as video data, image data, and audio data may be recorded in advance at the time of product shipment. In addition, the storage 1170 may record various kinds of information, for example, various kinds of data such as video data, image data, and audio data acquired from an external device, an external server, or the like via the communication unit 1132.

The video data, the image data, and the like recorded in the storage 1170 are output as the aerial floating image 3 via the image display 1102 and the retroreflection portion 1101. Video data, image data, and the like of display icons, an object to be operated by a user, and the like which are displayed as the aerial floating image 3 are also recorded in the storage 1170.

Layout information of display icons, an object, and the like displayed as the aerial floating image 3, information of various kinds of metadata related to the object, and the like are also recorded in the storage 1170. The audio data recorded in the storage 1170 is output as audio from, for example, the audio output unit 1140.

The image controller 1160 performs various kinds of control related to an image signal to be input to the image display 1102. For example, the image controller 1160 performs the control of image switching for determining which of an image signal to be stored in the memory 1109 or an image signal (video data) input to the image signal input unit 1131 is to be input to the image display 1120.

Also, the image controller 1160 may perform the control to form a composite image as the aerial floating image 3 by generating a superimposed image signal obtained by superimposing the image signal stored in the memory 1109 and the image signal input from the image signal input unit 1131 and inputting the superimposed image signal to the image display 1102.

Further, the image controller 1160 may perform the control to perform image processing on the image signal input from the image signal input unit 1131, the image signal to be stored in the memory 1109, or the like. Examples of the image processing include scaling processing for enlarging, reducing, and deforming an image, brightness adjustment processing for changing luminance, contrast adjustment processing for changing a contrast curve of an image, and retinex processing for decomposing an image into light components and changing weighting for each component.

In addition, the image controller 1160 may perform special effect image processing or the like for assisting a spatial operation (touch operation) of the user 200 to the image signal to be input to the image display 1102. The special effect image processing is performed based on, for example, the detection result of the touch operation of the user 200 by the spatial operation detector 1350 and the captured image of the user 200 by the imager 1180.

As described above, the aerial floating image display apparatus 1000 has various functions. However, the aerial floating image display apparatus 1000 does not need to have all of these functions, and may have any configuration as long as the apparatus has a function of forming the aerial floating image 3.

<Example of Aerial Floating Image Display Apparatus (2)>

Figure 4:
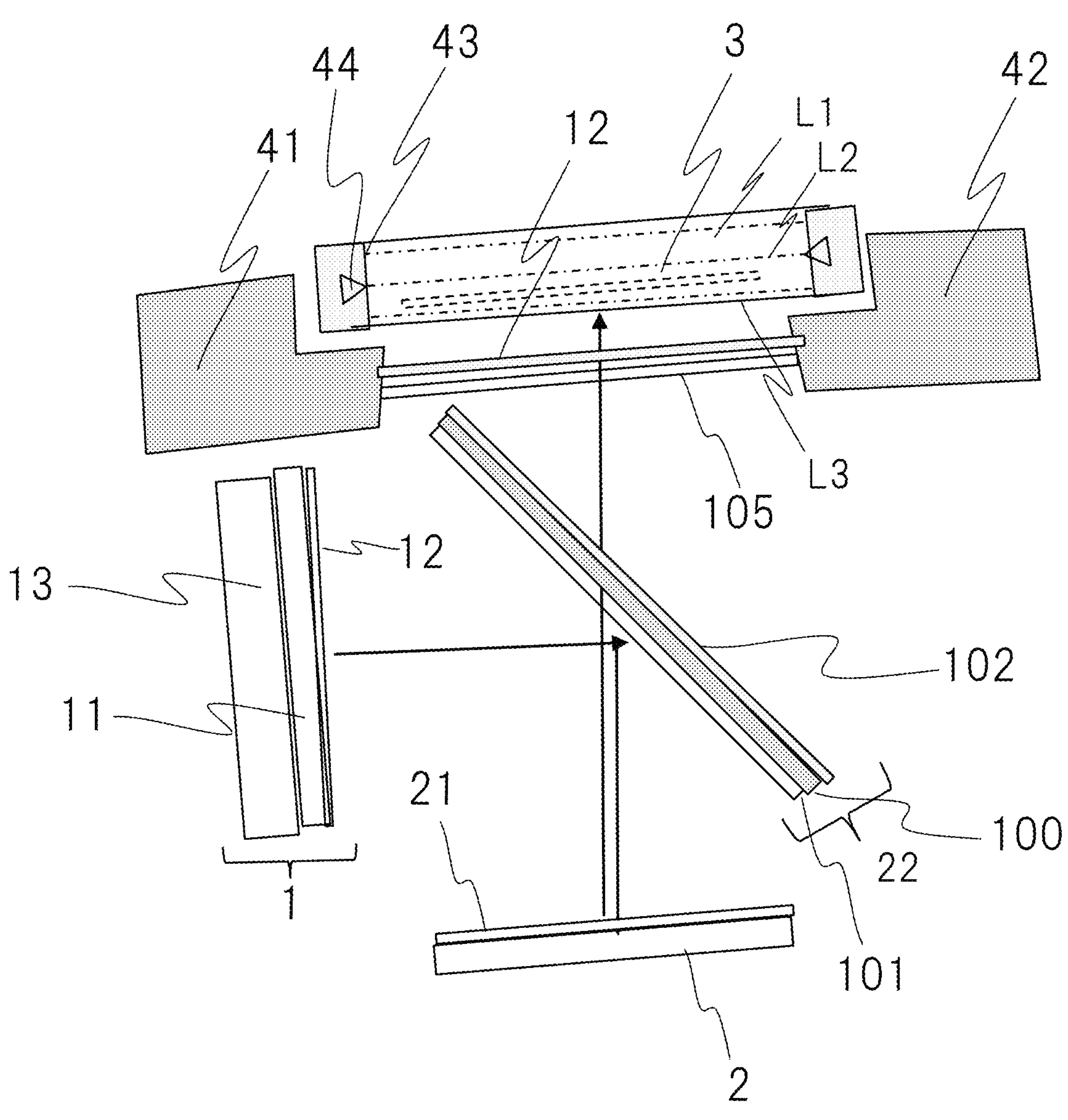
FIG. 4 is a diagram showing another example of the configuration of the main part of the aerial floating image display apparatus according to an embodiment of the present invention.

FIG. 4 is a diagram showing another example of the configuration of the main part of the aerial floating image display apparatus according to an embodiment of the present invention. The display apparatus 1 includes the liquid crystal display panel 11 and the light source apparatus 13 configured to generate light of a specific polarized wave having narrow-angle diffusion characteristics, the liquid crystal display panel 11 is composed of, for example, a panel of selected size from a small-sized liquid crystal display panel having a screen size of about 5 inches to a large-sized liquid crystal display panel having a screen size exceeding 80 inches, and the polarization separator 101 such as a reflective polarizing plate is provided on the surface of a returning mirror 22 to reflect image light from the liquid crystal display panel 11 toward the retroreflector 2. The image light of the specific polarized wave from the display apparatus 1 is reflected by a film (in the drawing, a sheet 101 is adhered) which is provided on the transparent member 100 and selectively reflects the image light of the specific polarized wave, and enters the retroreflector 2.

The λ/4 plate 21 is provided on the light incident surface of the retroreflector, and the image light is made to pass through the λ/4 plate 21 twice to convert a specific polarized wave into the other polarized wave, whereby the image light is transmitted through the polarization separator 101 and the aerial floating image 3, which is a real image, is displayed on the outside of the transparent member 100. An absorptive polarizing plate is provided on the external light incident surface of the transparent member 100. In the above-described polarization separator 101, since the polarization axes are not aligned due to retroreflection, a part of the image light is reflected and returns to the display apparatus 1. This light is reflected again on the image display surface of the liquid crystal display panel 11 constituting the display apparatus 1, so that a ghost image is generated and the image quality of the aerial floating image is significantly deteriorated. Therefore, in the present embodiment, the absorptive polarizing plate 12 is provided on the image display surface of the display apparatus 1 to transmit the image light and absorb the reflected light described above, thereby preventing the image quality from deteriorating due to the ghost image of the aerial floating image. Further, in order to reduce deterioration in image quality due to sunlight or illumination light outside the set, the absorptive polarizing plate 12 is preferably provided on the surface of the transparent member 100. The polarization separator 101 is formed of a reflective polarizing plate or a metal multilayer film that reflects a specific polarized wave.

Figure 5:
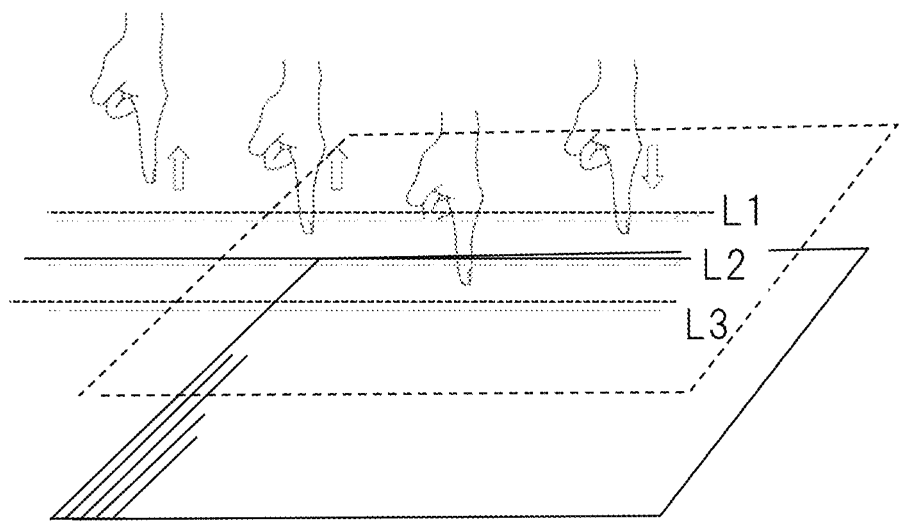
FIG. 5 is an explanatory diagram for describing the function of a sensing apparatus used in the aerial floating image display apparatus.

Then, sensors 44 having a ToF (Time of Fly) function are arranged in a plurality of layers as shown in FIG. 5 so as to sense a relationship of a distance and a position between an object and the sensors 44 with respect to the aerial floating image obtained by the aerial floating image display apparatus described above, so that coordinates in a depth direction and a moving direction and a moving speed of the object can be sensed in addition to coordinates in a plane direction of the object. In order to read a two-dimensional distance and position, a plurality of combinations of an ultraviolet light emitting portion and a light receiving portion are linearly arranged, light from a light emitting point is irradiated on an object, and reflected light is received by the light receiving portion. The distance to the object becomes clear by the product of the difference between the light emitting time and the light receiving time and the speed of light. Also, the coordinates on the plane can be read from the coordinates at a portion where the difference between the light emitting time and the light receiving time is the smallest at the plurality of light emitting portions and light receiving portions. As described above, three-dimensional coordinate information can also be obtained by combining the coordinates of an object on a plane (two-dimensional) and a plurality of the above-described sensors.

Figure 6:
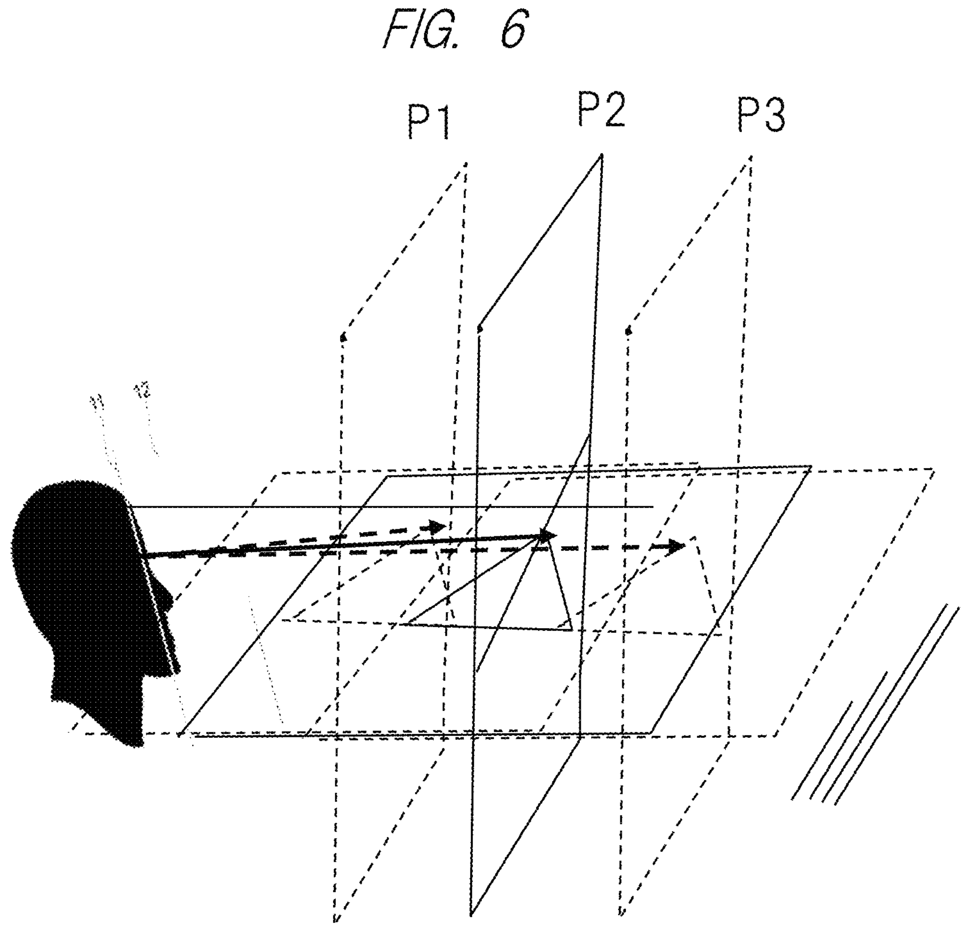
FIG. 6 is an explanatory diagram of the principle of a three-dimensional image display used in the aerial floating image display apparatus.

Further, a method of obtaining a three-dimensional aerial floating image as the above-described aerial floating image display apparatus will be described with reference to FIG. 6. FIG. 6 is an explanatory diagram of the principle of the three-dimensional image display used in the aerial floating image display apparatus. Horizontal lenticular lenses are arranged in accordance with the pixels of the image display screen of the liquid crystal display panel 11 of the display apparatus 1 shown in FIG. 4. As a result, in order to display the motion parallaxes from the three directions of the motion parallaxes P1, P2, and P3 in the horizontal direction of the screen as shown in FIG. 6, images from the three directions are set as one block for each three pixels, image information from the three directions is displayed for each pixel, and the light emission direction is controlled by the action of the corresponding lenticular lens (indicated by vertical lines in FIG. 6) to separately emit the light in three directions. As a result, a stereoscopic image of three parallaxes can be displayed.

<Reflective Polarizing Plate>

Figure 7:
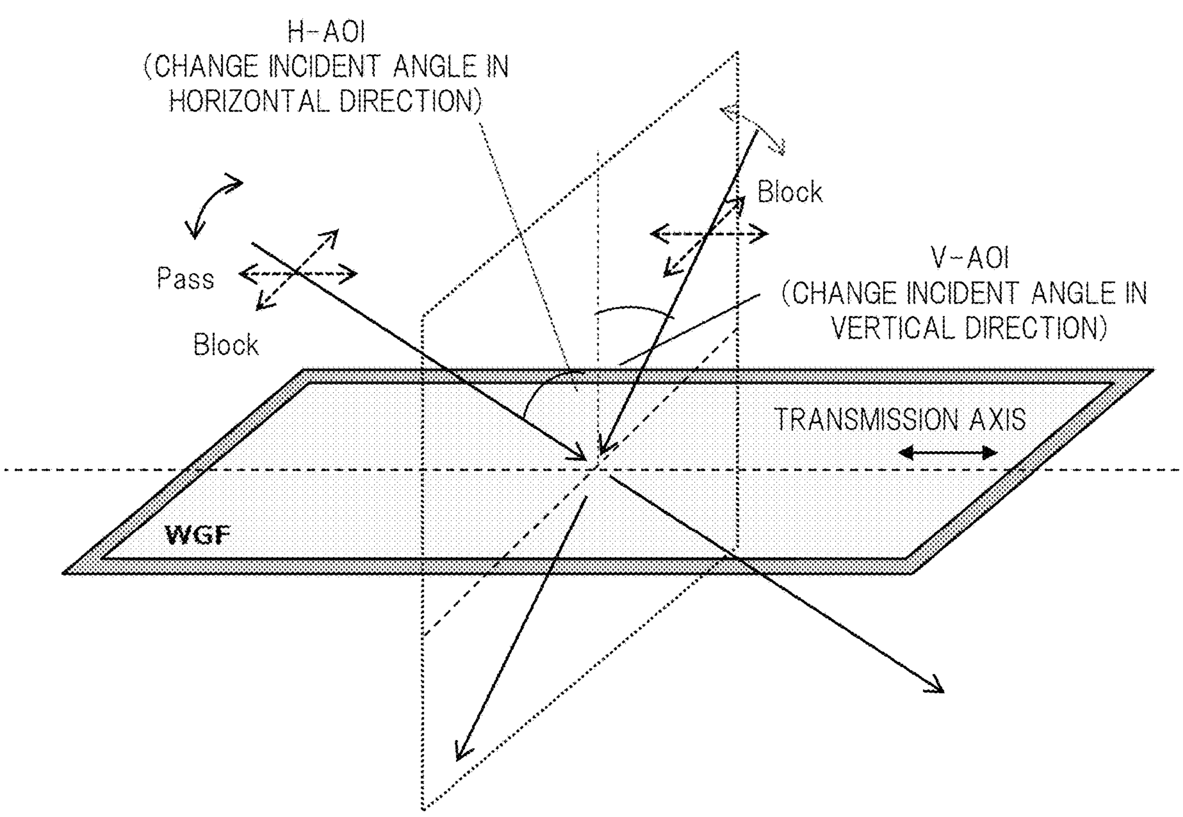
FIG. 7 is an explanatory diagram of a measurement system for evaluating the characteristics of a reflective polarizing plate.
Figure 8:
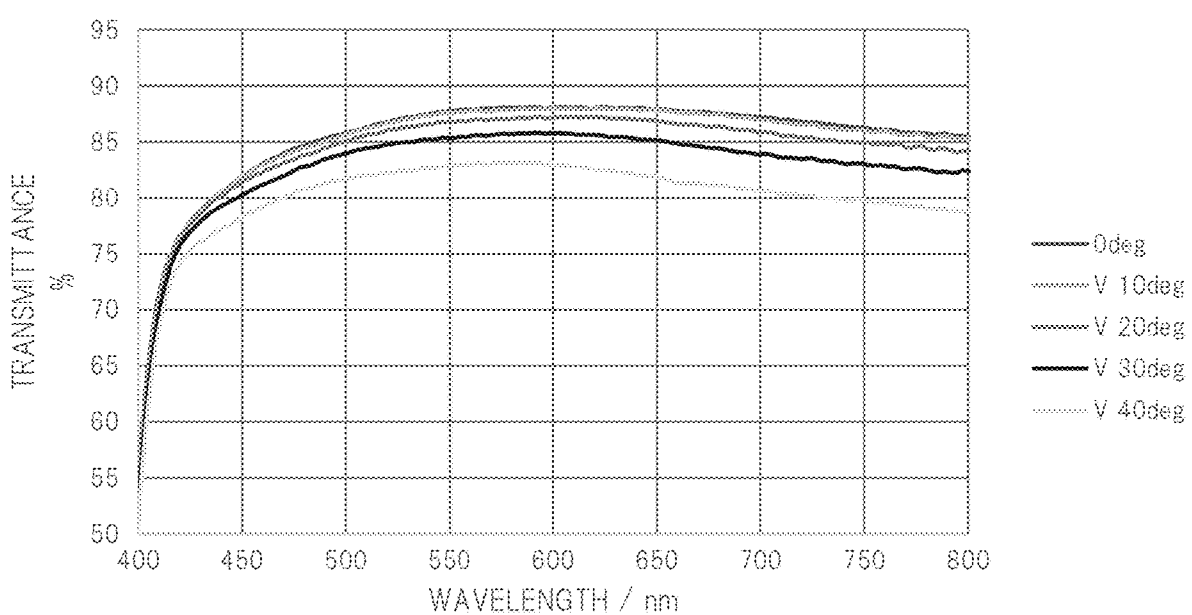
FIG. 8 is a characteristic diagram showing transmittance characteristics of a transmission axis of the reflective polarizing plate with respect to a light beam incident angle.
Figure 9:
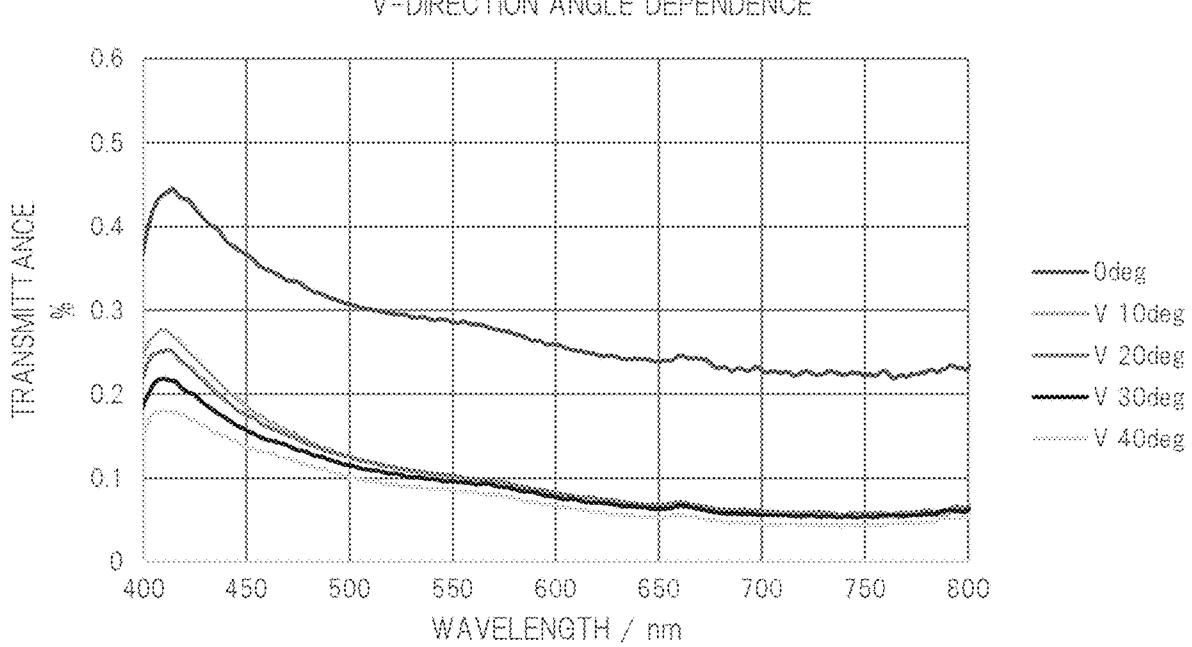
FIG. 9 is a characteristic diagram showing transmittance characteristics of a reflection axis of the reflective polarizing plate with respect to the light beam incident angle.
Figure 10:
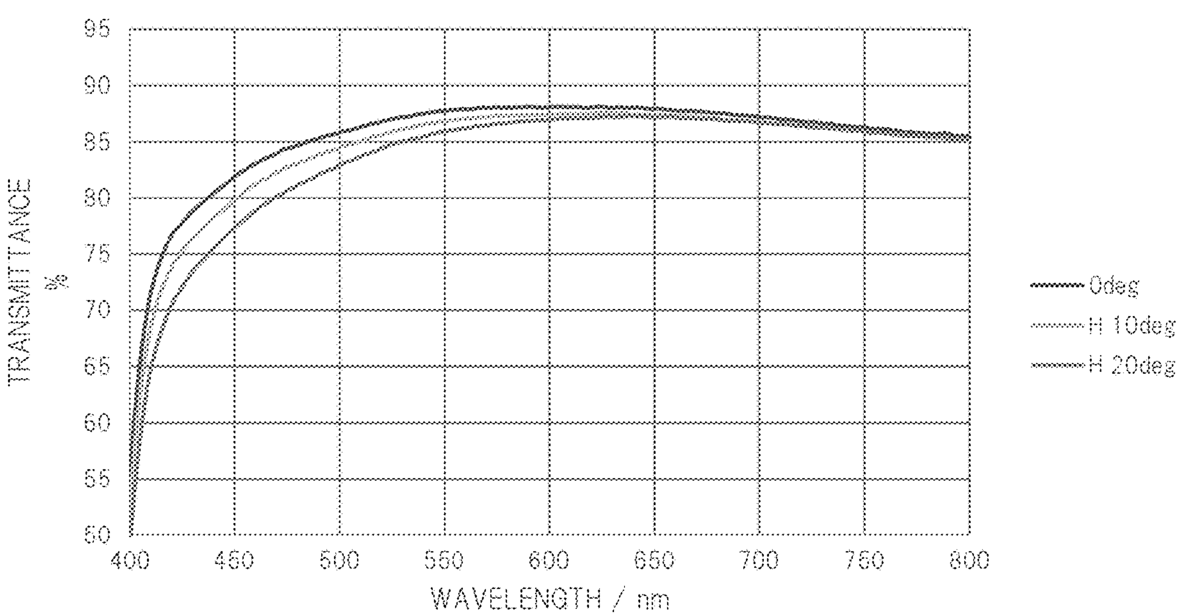
FIG. 10 is a characteristic diagram showing transmittance characteristics of the transmission axis of the reflective polarizing plate with respect to the light beam incident angle.
Figure 11:
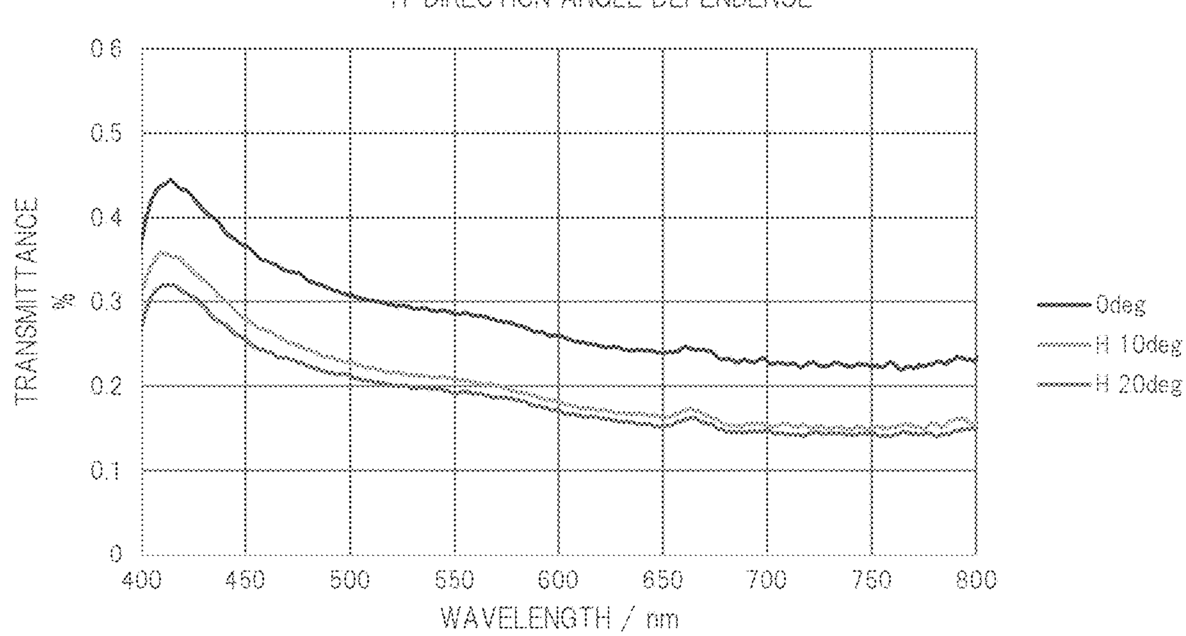
FIG. 11 is a characteristic diagram showing transmittance characteristics of the reflection axis of the reflective polarizing plate with respect to the light beam incident angle.

In the aerial floating image display apparatus according to the present embodiment, the polarization separator 101 is used to improve the contrast performance, which determines the image quality, more than a general half mirror. The characteristics of a reflective polarizing plate will be described as an example of the polarization separator 101 of the present embodiment. FIG. 7 is an explanatory diagram of a measurement system for evaluating the characteristics of the reflective polarizing plate. FIG. 8 and FIG. 9 show the transmission characteristics and the reflection characteristics with respect to the light beam incident angle from the direction perpendicular to the polarization axis of the reflective polarizing plate in FIG. 7 as V-AOI, respectively. Similarly, FIG. 10 and FIG. 11 show the transmission characteristics and the reflection characteristics with respect to the light beam incident angle from the direction horizontal to the polarization axis of the reflective polarizing plate as H-AOI, respectively.

As shown in FIG. 8 and FIG. 9, in the reflective polarizing plate having the grid structure, the characteristics for the light from the direction perpendicular to the polarization axis are deteriorated. Therefore, the specification along the polarization axis is desirable, and the light source of the present embodiment capable of emitting the image light from the liquid crystal display panel at a narrow angle is an ideal light source. Similarly, the characteristics in the horizontal direction are deteriorated with respect to oblique light. In consideration of the above characteristics, a configuration example of the present embodiment in which a light source capable of emitting image light from a liquid crystal display panel at a narrower angle is used as a backlight of the liquid crystal display panel will be described below. Thereby, a high-contrast aerial floating image can be provided.

<Display Apparatus>

Next, the display apparatus 1 of the present embodiment will be described with reference to the drawings. The display apparatus 1 of the present embodiment includes an image display element 11 (liquid crystal display panel) and the light source apparatus 13 constituting a light source thereof, and FIG. 12 shows the light source apparatus 13 together with the liquid crystal display panel as a developed perspective view.

Figure 12:
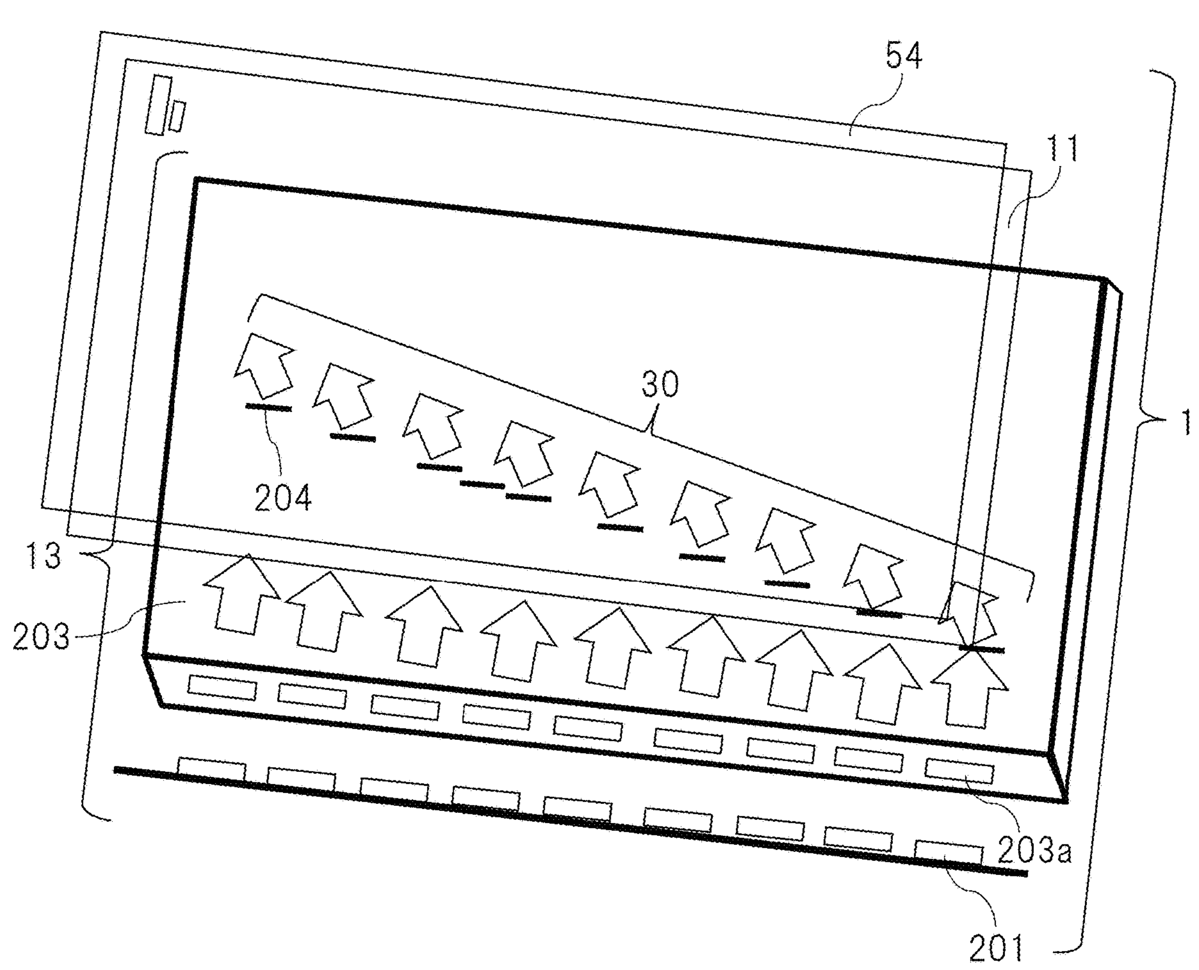
FIG. 12 is a cross-sectional view showing an example of a specific configuration of a light source apparatus.

In the liquid crystal display panel (image display element 11), as indicated by arrows 30 in FIG. 12, an illumination light flux having narrow-angle diffusion characteristics, that is, characteristics similar to laser light with strong directivity (straightness) and a polarization plane aligned in one direction is obtained by the light from the light source apparatus 13 as a backlight apparatus, and the image light modulated in accordance with an input image signal is reflected by the retroreflector 2 and transmitted through the transparent member 100, thereby forming an aerial floating image as a real image (see FIG. 1). Further, in FIG. 12, the display apparatus 1 includes the liquid crystal display panel 11, a light direction conversion panel 54 configured to control the directional characteristics of the light flux emitted from the light source apparatus 13, and a narrow-angle diffusion plate as needed (not shown). Namely, polarizing plates are provided on both surfaces of the liquid crystal display panel 11, and image light of a specific polarized wave is emitted at the light intensity modulated by the image signal (see the arrows 30 in FIG. 12). Thereby, a desired image is projected as the light of a specific polarized wave having high directivity (straightness) toward the retroreflector 2 via the light direction conversion panel 54, reflected by the retroreflector 2, and then transmitted toward the eyes of an observer outside the store (space) to form the aerial floating image 3. Note that a protective cover 50 (see FIG. 13 and FIG. 14) may be provided on the surface of the light direction conversion panel 54 described above.

In the present embodiment, in order to improve the utilization efficiency of the light flux 30 emitted from the light source apparatus 13 and significantly reduce power consumption, in the display apparatus 1 including the light source apparatus 13 and the liquid crystal display panel 11, the directivity of the light from the light source apparatus 13 (see the arrows 30 in FIG. 12) can be controlled by a transparent sheet (not shown) provided on the surface of the transparent member 100 (window glass 105 or the like) such that a floating image can be formed at a desired position after the light is projected toward the retroreflector 2 and reflected by the retroreflector 2. Specifically, the transparent sheet controls the imaging position of the floating image while providing high directivity by an optical component such as a Fresnel lens or a linear Fresnel lens. According to this, the image light from the display apparatus 1 efficiently reaches an observer outside the show window 105 (e.g., a sidewalk) with high directivity (straightness) like laser light, and as a result, it is possible to display a high-quality floating image with high resolution and to significantly reduce power consumption of the display apparatus 1 including an LED element 201 of the light source apparatus 13.

<Example of Display Apparatus (1)>

Figure 13:
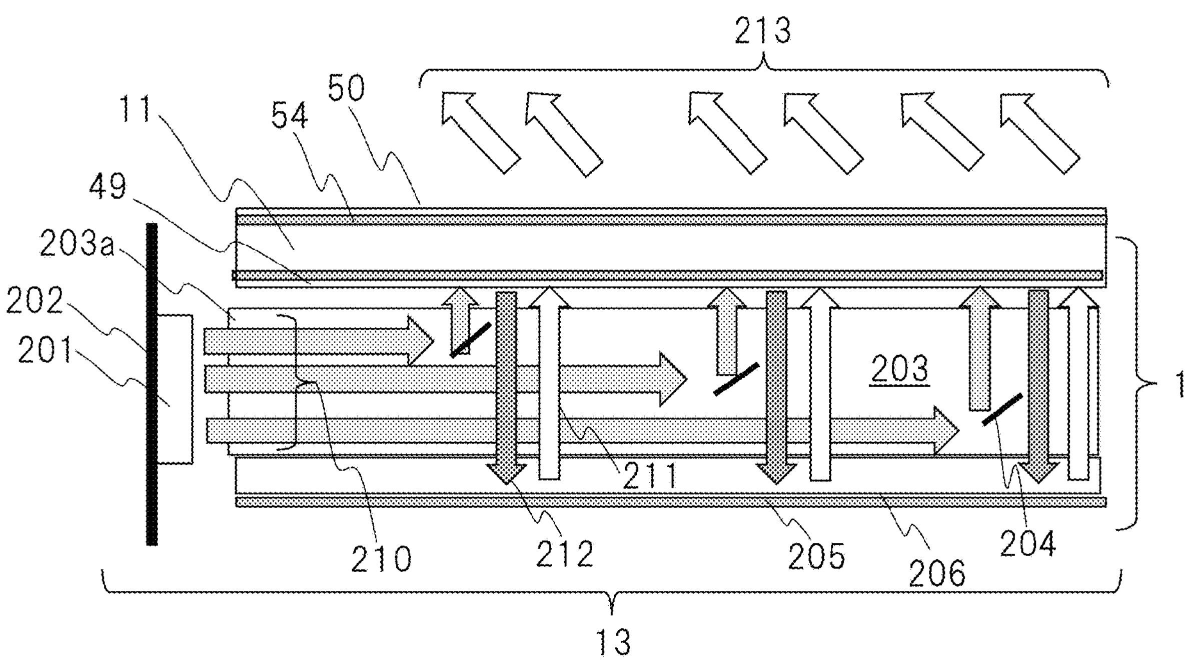
FIG. 13 is a cross-sectional view showing an example of a specific configuration of the light source apparatus.

FIG. 13 shows an example of a specific configuration of the display apparatus 1. In FIG. 13, the liquid crystal display panel 11 and the light direction conversion panel 54 are arranged on the light source apparatus 13 in FIG. 12. The light source apparatus 13 is formed of, for example, plastic or the like on a case shown in FIG. 12, and is configured to accommodate the LED element 201 and a light guide 203 therein. Also, as shown in FIG. 12 and the like, in order to convert the divergent light from each LED element 201 into a substantially parallel light flux, the end surface of the light guide 203 is provided with a lens shape in which the cross-sectional area gradually increases toward the opposite surface with respect to the light receiving portion and which has a function of gradually reducing the divergence angle when making total reflection plural times during the propagation therein. The liquid crystal display panel 11 constituting the display apparatus 1 is attached to the upper surface of the light source apparatus 13. Further, the LED (Light Emitting Diode) element 201 which is a semiconductor light source and an LED substrate 202 on which a control circuit thereof is mounted may be attached to one side surface (an end surface on the left side in this example) of the case of the light source apparatus 13, and a heat sink which is a member for cooling heat generated in the LED element and the control circuit may be attached to an outer surface of the LED substrate 202.

Also, to a frame (not shown) of the liquid crystal display panel attached to the upper surface of the case of the light source apparatus 13, the liquid crystal display panel 11 attached to the frame, an FPC (Flexible Printed Circuits) board (not shown) electrically connected to the liquid crystal display panel, and the like are attached. Namely, the liquid crystal display panel 11 which is a liquid crystal display element generates a display image by modulating the intensity of transmitted light based on a control signal from a control circuit (not shown) constituting an electronic device together with the LED element 201 which is a solid-state light source. At this time, since the generated image light has a narrow diffusion angle and only a specific polarized component, it is possible to obtain a novel and unconventional display apparatus which is close to a surface-emitting laser image source driven by an image signal. Note that, at present, a laser light flux having the same size as the image obtained by the above-described display apparatus 1 cannot be obtained by using a laser apparatus for both technical and safety reasons. Therefore, in the present embodiment, for example, light close to the above-described surface-emitting laser image light is obtained from a light flux from a general light source including an LED element.

Subsequently, the configuration of the optical system accommodated in the case of the light source apparatus 13 will be described in detail with reference to FIG. 13 and FIG. 14.

Figure 14:
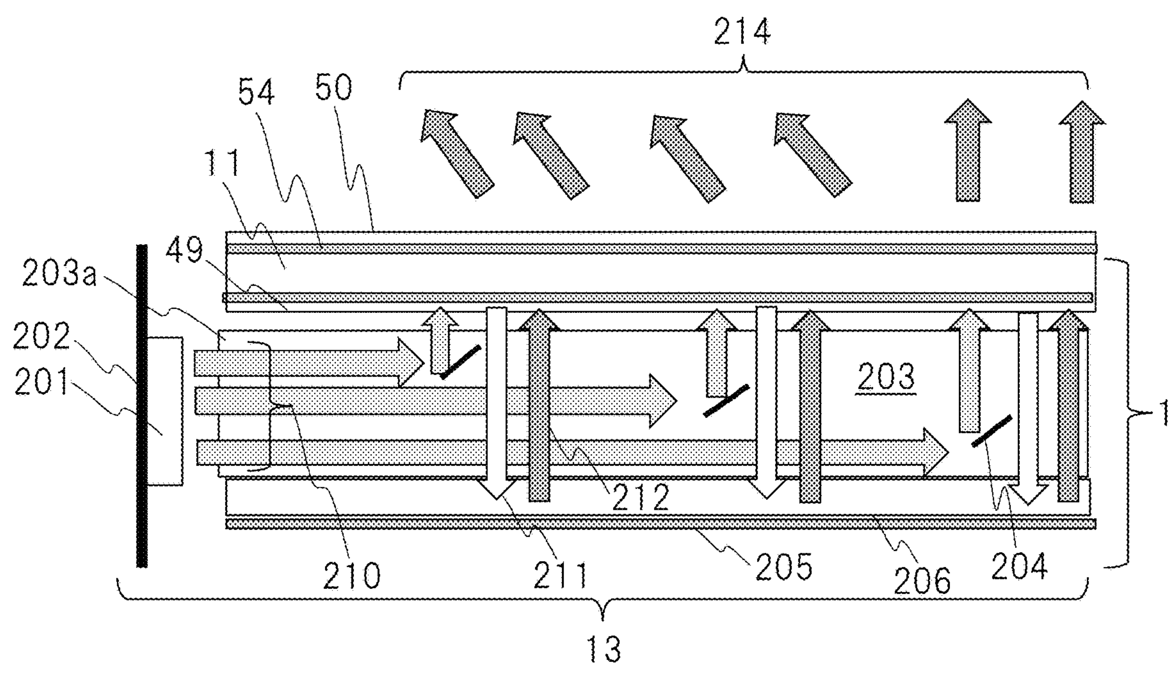
FIG. 14 is a cross-sectional view showing an example of a specific configuration of the light source apparatus.

Since FIG. 13 and FIG. 14 are cross-sectional views, only one of a plurality of LED elements 201 constituting the light source is shown, and these are converted into substantially collimated light by the shape of a light-receiving end surface 203*a* of the light guide 203. Therefore, the light receiving portion on the end surface of the light guide and the LED element are attached while maintaining a predetermined positional relationship. Note that each of the light guides 203 is formed of, for example, a translucent resin such as acrylic. Also, the LED light-receiving surface at the end of the light guide has, for example, a conical convex outer peripheral surface obtained by rotating a parabolic cross section, the top thereof has a concave portion having a convex portion (i.e., a convex lens surface) formed at its central portion, and the central portion of the flat surface portion thereof has a convex lens surface protruding outward (or may be a concave lens surface recessed inward) (not shown). Note that the external shape of the light receiving portion of the light guide to which the LED element 201 is attached is a paraboloid shape that forms a conical outer peripheral surface, and is set within a range of an angle at which light emitted from the LED element in the peripheral direction can be totally reflected inside the paraboloid, or has a reflection surface formed thereon.

On the other hand, each of the LED elements 201 is arranged at a predetermined position on the surface of the LED substrate 202 which is a circuit board for the LED elements. The LED substrate 202 is arranged and fixed to the LED collimator (the light-receiving end surface 203*a*) such that each of the LED elements 201 on the surface thereof is located at the central portion of the concave portion described above.

With such a configuration, the light emitted from the LED elements 201 can be extracted as substantially parallel light due to the shape of the light-receiving end surface 203*a* of the light guide 203, and the utilization efficiency of the generated light can be improved.

As described above, the light source apparatus 13 is configured by attaching a light source unit, in which a plurality of LED elements 201 as light sources are arranged, to the light-receiving end surface 203*a* which is a light receiving portion provided on the end surface of the light guide 203. In the light source apparatus 13, the divergent light flux from the LED elements is converted into substantially parallel light by the lens shape of the light-receiving end surface 203*a* on the end surface of the light guide, is guided through the inside of the light guide 203 (in the direction parallel to the drawing) as indicated by arrows, and is emitted toward the liquid crystal display panel 11 arranged substantially parallel to the light guide (in the direction perpendicular to the front from the drawing) by a light flux direction converter 204. The uniformity of the light flux that enters the liquid crystal display panel 11 can be controlled by optimizing the distribution (density) of the light flux direction converter by the shape inside the light guide or the shape of the surface of the light guide. By providing, for example, a portion having a different refractive index in the shape of the surface of the light guide or inside the light guide, the above-described light flux direction converter 204 emits the light flux propagating through the inside of the light guide toward the liquid crystal display panel 11 (in the direction perpendicular to the front from the drawing) arranged substantially in parallel to the light guide. At this time, if the relative luminance ratio when comparing the luminance at the center of the screen with the luminance of the peripheral portion of the screen in a state in which the liquid crystal display panel 11 faces the center of the screen and the viewpoint is placed at the same position as the diagonal dimension of the screen is 20% or more, there is no problem in practical use, and if the relative luminance ratio exceeds 30%, the characteristics will be even better.

Note that FIG. 13 is a cross-sectional layout drawing for describing the configuration and action of the light source of the present embodiment that performs polarization conversion in the light source apparatus 13 including the light guide 203 and the LED element 201 described above. In FIG. 13, the light source apparatus 13 is composed of, for example, the light guide 203 which is formed of plastic or the like and is provided with the light flux direction converter 204 on its surface or inside, the LED element 201 as a light source, a reflection sheet 205, a retardation plate 206, and a lenticular lens, and the liquid crystal display panel 11 including polarizing plates on its light source light incident surface and image light emission surface is attached to the upper surface of the light source apparatus 13.

Also, a film-shaped or sheet-shaped reflective polarizing plate 49 is provided on the light source light incident surface (lower surface of the drawing) of the liquid crystal display panel 11 corresponding to the light source apparatus 13, by which one polarized wave (e.g., a P-wave) 212 of the natural light flux 210 emitted from the LED element 201 is selectively reflected. Then, the reflected light is reflected by the reflection sheet 205 provided on one surface (lower side of the drawing) of the light guide 203 and is directed toward the liquid crystal display panel 11 again. Then, a retardation plate (λ/4 plate) is provided between the reflection sheet 205 and the light guide 203 or between the light guide 203 and the reflective polarizing plate 49, and the light is reflected by the reflection sheet 205 to pass through the retardation plate twice, so that the reflected light flux is converted from P-polarized light to S-polarized light and the utilization efficiency of the light source light as image light can be improved. The image light flux (arrows 213 in FIG. 13) whose light intensity is modulated by the image signal in the liquid crystal display panel 11 enters the retroreflector 2 and is reflected and then transmitted through the window glass 105, so that an aerial floating image which is a real image can be obtained inside or outside the store (space) as shown in FIG. 1.

Similar to FIG. 13, FIG. 14 is a cross-sectional layout drawing for describing the configuration and action of the light source of the present embodiment that performs polarization conversion in the light source apparatus 13 including the light guide 203 and the LED element 201. The light source apparatus 13 is similarly composed of, for example, the light guide 203 which is formed of plastic or the like and is provided with the light flux direction converter 204 on its surface or inside, the LED element 201 as a light source, the reflection sheet 205, the retardation plate 206, and the lenticular lens, and the liquid crystal display panel 11 including polarizing plates on its light source light incident surface and image light emission surface is attached as the image display element to the upper surface of the light source apparatus 13.

Also, the film-shaped or sheet-shaped reflective polarizing plate 49 is provided on the light source light incident surface (lower surface of the drawing) of the liquid crystal display panel 11 corresponding to the light source apparatus 13, by which one polarized wave (e.g., a S-wave) 211 of the natural light flux 210 emitted from the LED light source 201 is selectively reflected. Then, the reflected light is reflected by the reflection sheet 205 provided on one surface (lower side of the drawing) of the light guide 203 and is directed toward the liquid crystal display panel 11 again. Then, a retardation plate (λ/4 plate) is provided between the reflection sheet 205 and the light guide 203 or between the light guide 203 and the reflective polarizing plate 49, and the light is reflected by the reflection sheet 205 to pass through the retardation plate twice, so that the reflected light flux is converted from S-polarized light to P-polarized light and the utilization efficiency of the light source light as image light can be improved. The image light flux (arrows 214 in FIG. 14) whose light intensity is modulated by the image signal in the liquid crystal display panel 11 enters the retroreflector 2 and is reflected and then transmitted through the window glass 105, so that an aerial floating image which is a real image can be obtained inside or outside the store (space) as shown in FIG. 1.

In the light source apparatuses shown in FIG. 13 and FIG. 14, in addition to the action of the polarizing plate provided on the light incident surface of the corresponding liquid crystal display panel 11, the polarization component on one side is reflected by the reflective polarizing plate, and thus the contrast ratio theoretically obtained is the product of the reciprocal of the cross transmittance of the reflective polarizing plate and the reciprocal of the cross transmittance obtained by the two polarizing plates attached to the liquid crystal display panel. Therefore, high contrast performance can be obtained. In practice, it has been experimentally confirmed that the contrast performance of the display image is improved by 10 times or more. As a result, a high-quality image comparable to an image of a self-luminous organic EL can be obtained.

<Example of Display Apparatus (2)>

Figure 15:
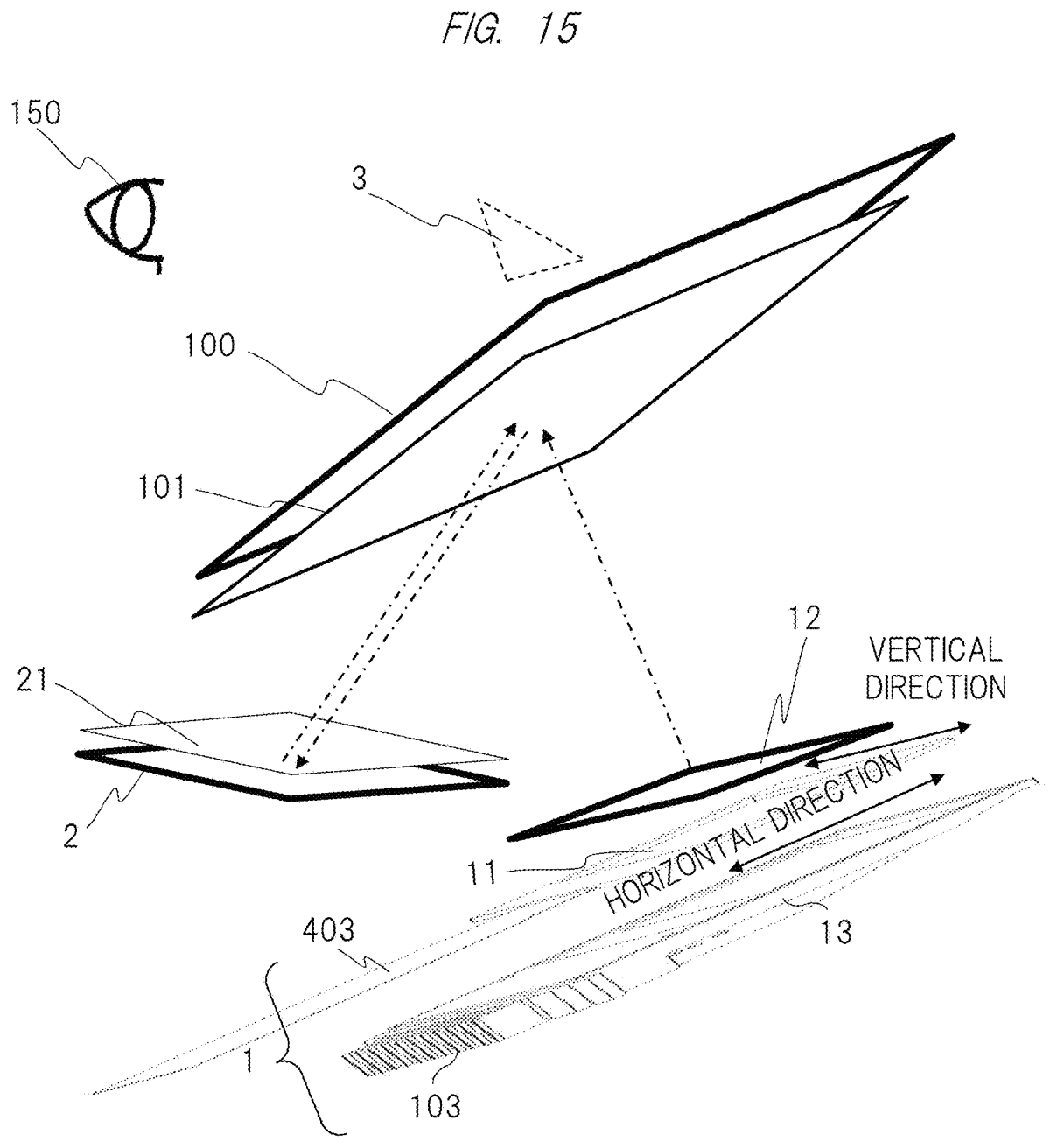

FIG. 15 shows another example of a specific configuration of the display apparatus 1. The light source apparatus 13 in FIG. 15 is the same as the light source apparatus in FIG. 17 and the like. The light source apparatus 13 is composed of an LED, a collimator, a synthetic diffusion block, a light guide, and the like accommodated in a case made of, for example, plastic, and the liquid crystal display panel 11 is attached to the upper surface thereof. Further, LED (Light Emitting Diode) elements 14*a* and 14*b* which are semiconductor light sources and an LED substrate 102 on which a control circuit thereof is mounted are attached to one side surface of the case of the light source apparatus 13, and a heat sink 103 which is a member for cooling the heat generated in the LED elements and the control circuit is attached to an outer surface of the LED substrate 102 (see also FIG. 17, FIG. 18, and the like).

Also, to a frame of the liquid crystal display panel attached to the upper surface of the case, the liquid crystal display panel 11 attached to the frame, an FPC (Flexible Printed Circuits) board 403 (see FIG. 7) electrically connected to the liquid crystal display panel 11, and the like are attached. Namely, the liquid crystal display panel 11 which is a liquid crystal display element generates a display image by modulating the intensity of transmitted light based on a control signal from a control circuit (not shown here) constituting an electronic device together with the LED elements 14*a* and 14*b* which are solid-state light sources.

<Example of Display Apparatus (3)>

Subsequently, another example of a specific configuration of the display apparatus 1 will be described with reference to FIG. 16. The light source apparatus of the display apparatus 1 converts a divergent light flux of natural light (a mixture of a P-polarized wave and an S-polarized wave) from the LED into a substantially parallel light flux by an LED collimator 18, and reflects the light flux toward the liquid crystal display panel 11 by a reflective light guide 304. The reflected light enters the wavelength plate and the reflective polarizing plate 49 arranged between the liquid crystal display panel 11 and the reflective light guide 304. A specific polarized wave (e.g., an S-polarized wave) is reflected by the reflective polarizing plate and returns to the reflection surface with its phase converted by the wavelength plate, and passes through the retardation plate again to be converted into a polarized wave (e.g., a P-polarized wave) that transmits through the reflective polarizing plate.

As a result, the natural light from the LED is aligned with a specific polarized wave (e.g., P-polarized wave) and enters the liquid crystal display panel 11, and the luminance is modulated in accordance with an image signal to display an image on the panel surface. As in the above-described example, a plurality of LEDs constituting the light source are provided (however, only one LED is shown in FIG. 16 due to the vertical cross section), and these LEDs are attached at predetermined positions with respect to the LED collimator 18. Note that each of the LED collimators 18 is formed of, for example, a translucent resin such as acrylic or glass. Further, the LED collimator 18 has a conical convex outer peripheral surface obtained by rotating a parabolic cross section, and the top thereof has a concave portion in which a convex portion (i.e., a convex lens surface) is formed at its central portion. Also, the central portion of the flat surface portion thereof has a convex lens surface protruding outward (or may be a concave lens surface recessed inward). Note that the paraboloid that forms the conical outer peripheral surface of the LED collimator 18 is set within a range of an angle at which light emitted from the LED in the peripheral direction can be totally reflected inside the paraboloid, or has a reflection surface formed thereon.

Figure 16:
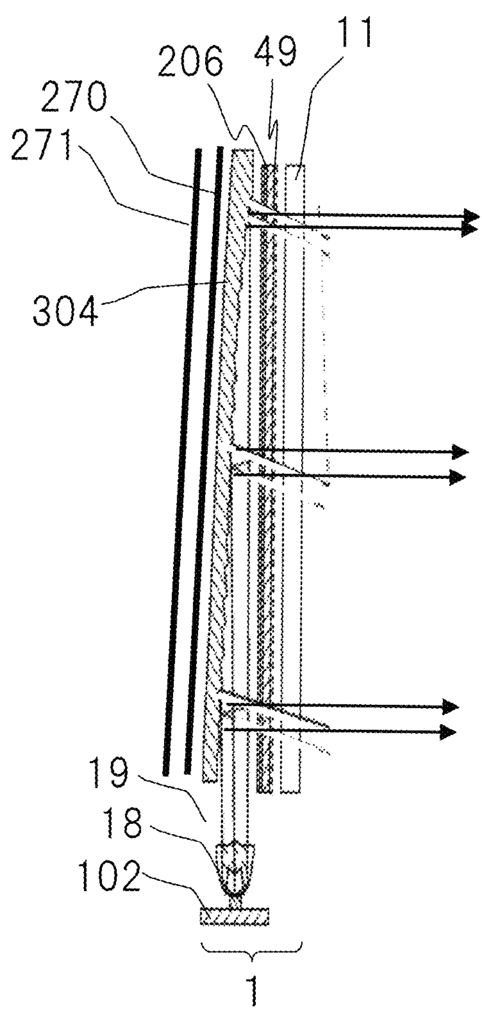
FIG. 16 is a cross-sectional view showing a configuration of a display apparatus according to an embodiment of the present invention.
Figure 17:
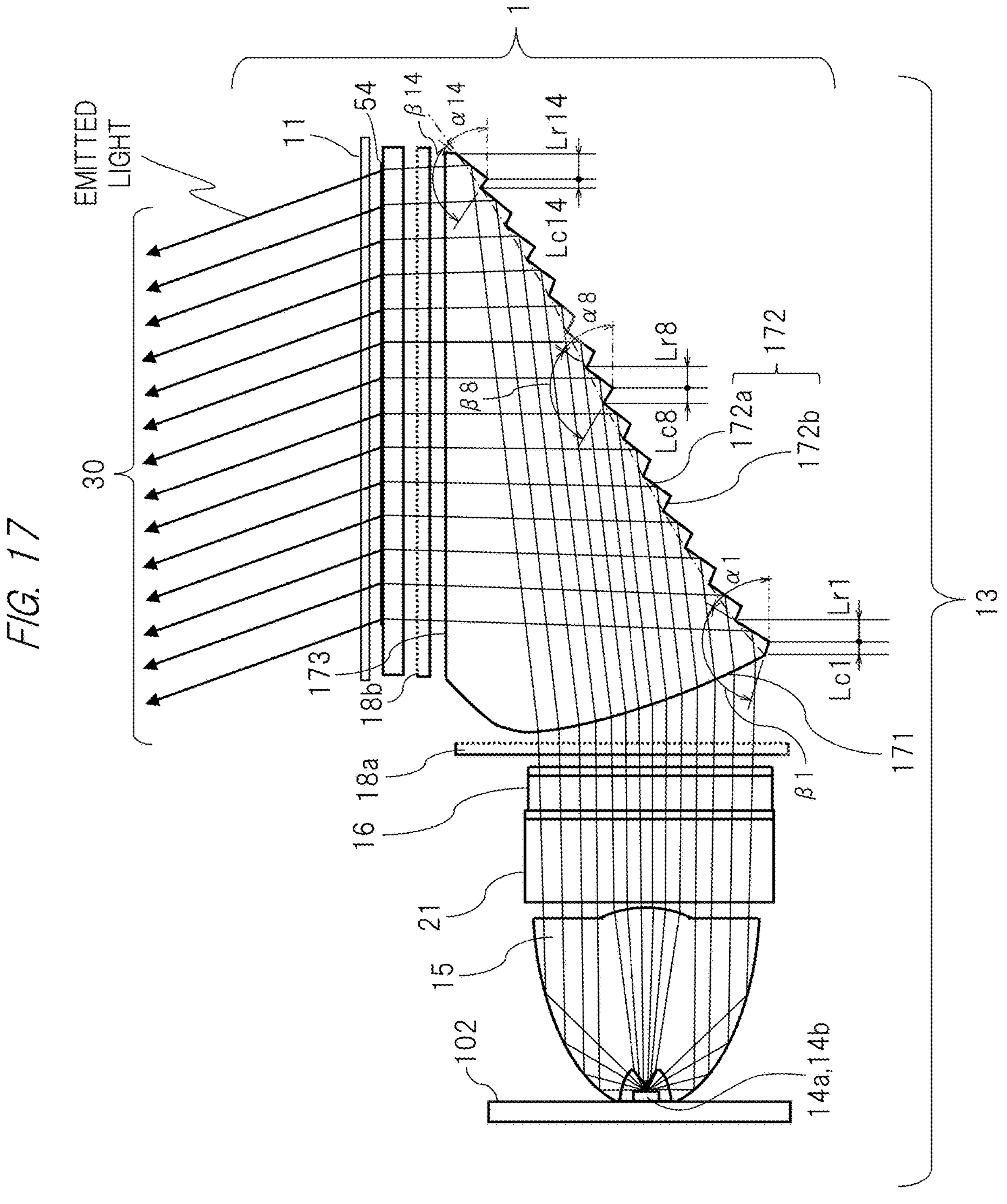
FIG. 17 is a cross-sectional view showing an example of a specific configuration of the light source apparatus.
Figure 18:
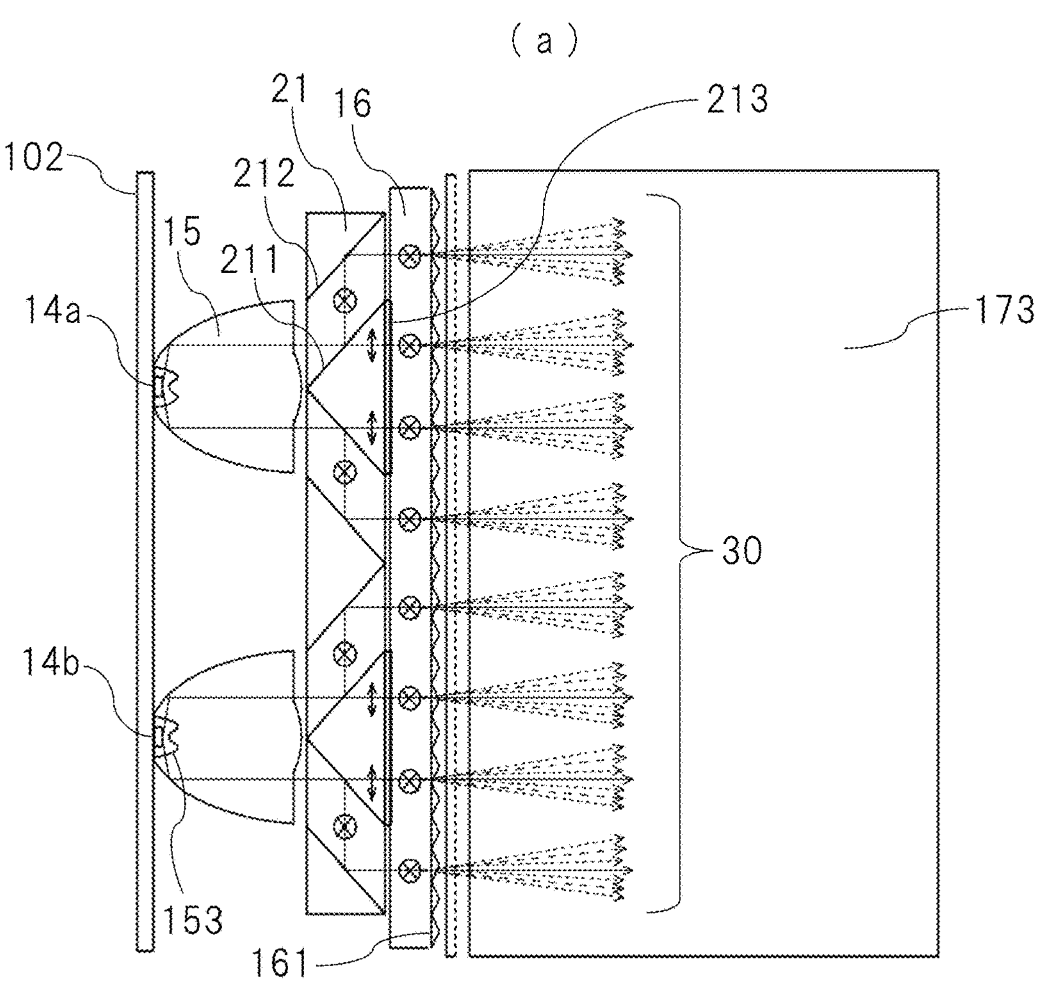
FIG. 18 is a cross-sectional view showing an example of a specific configuration of the light source apparatus.
Figure 18:
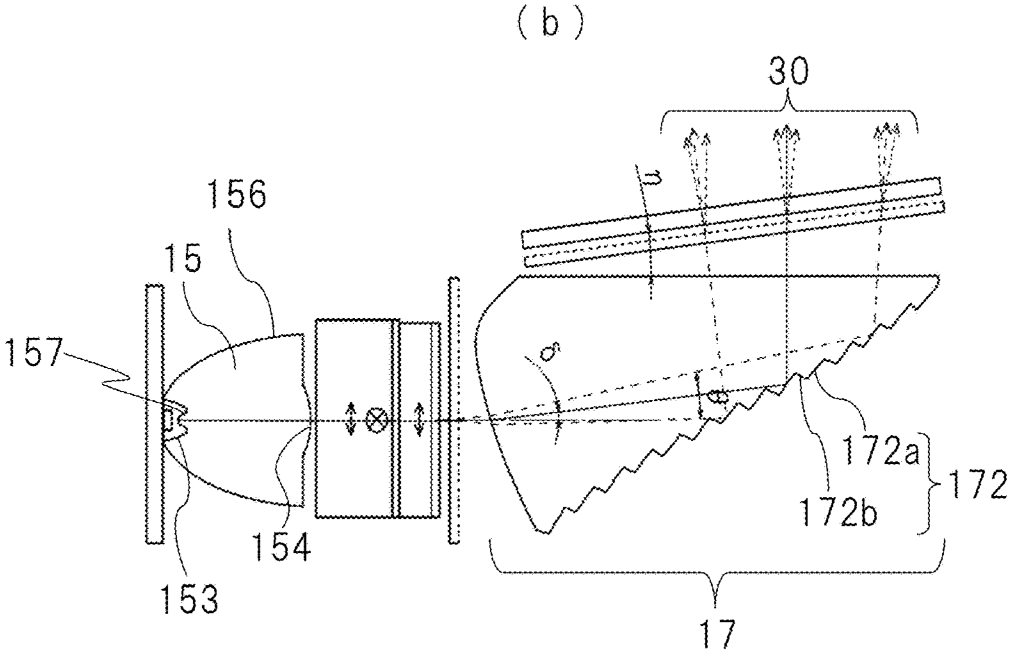

The above-described configuration is the same as that of the light source apparatus of the display apparatus shown in FIG. 17, FIG. 18, and the like. Further, the light converted into substantially parallel light by the LED collimator 18 shown in FIG. 16 is reflected by the reflective light guide 304, light of a specific polarized wave is transmitted by the action of the reflective polarizing plate 49, and the reflected light of the other polarized wave is transmitted through the light guide 304 again and reflected by a reflection plate 271 provided on the other surface of the light guide that is not in contact with the liquid crystal display panel 11. At this time, the light passes through a retardation plate (λ/4 plate) 270 arranged between the reflection plate 271 and the liquid crystal display panel 11 twice to be subjected to polarization conversion, is transmitted through the light guide 304 again, is transmitted through the reflective polarizing plate 49 provided on the opposite surface, and is made to enter the liquid crystal display panel 11 with the aligned polarization direction. As a result, all the light of the light source can be used, and thus the utilization efficiency of light is doubled.

Figure 22:
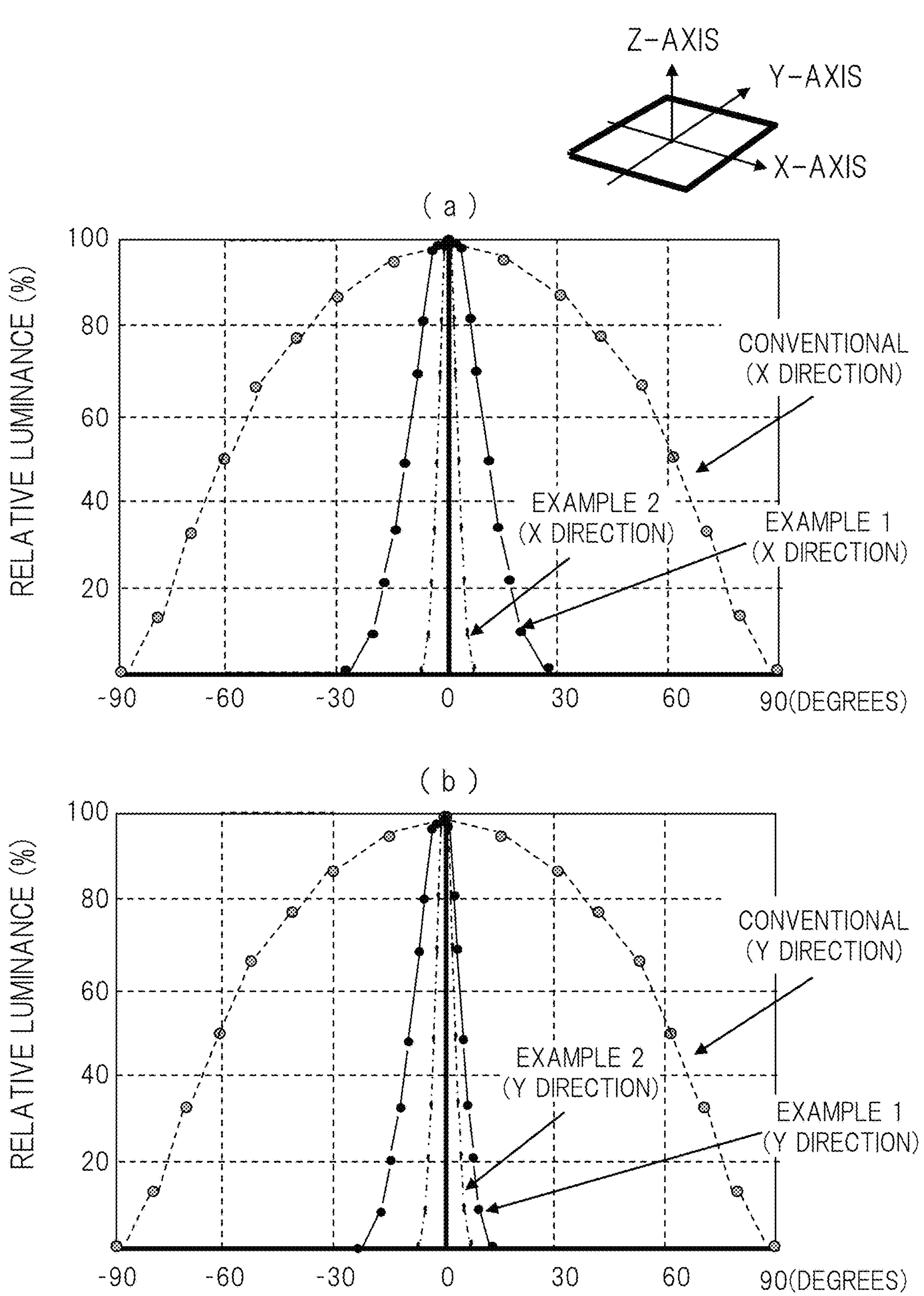
FIG. 22 is an explanatory diagram for describing diffusion characteristics of the display apparatus.

In a conventional TV set, light emitted from the liquid crystal display panel has similar diffusion characteristics in both the horizontal direction of the screen (indicated by the X-axis in FIG. 22(*a*)) and the vertical direction of the screen (indicated by the Y-axis in FIG. 22 (*b*)). On the other hand, in the diffusion characteristics of the light flux emitted from the liquid crystal display panel of the present embodiment, for example, as shown in Example 1 in FIG. 22, the viewing angle at which the luminance becomes 50% of that in front view (angle of 0 degrees) is 13 degrees, and this is ⅕ of the conventional viewing angle of 62 degrees. Similarly, the reflection angle of the reflective light guide, the area of the reflection surface, and the like are optimized such that the viewing angle in the vertical direction is made uneven in top and bottom and the viewing angle on the upper side is suppressed to about ⅓ of the viewing angle on the lower side. As a result, the amount of image light toward the monitoring direction is significantly improved as compared with the conventional liquid crystal TV, and the luminance is 50 times or more.

Further, in the viewing angle characteristics shown in Example 2 in FIG. 22, the viewing angle at which the luminance becomes 50% of that in front view (angle of 0 degrees) is 5 degrees, and this is 1/12 of the conventional viewing angle of 62 degrees. Similarly, the reflection angle of the reflective light guide, the area of the reflection surface, and the like are optimized such that the viewing angle in the vertical direction is made even in top and bottom and the viewing angle is suppressed to about 1/12 of the conventional viewing angle. As a result, the amount of image light toward the monitoring direction is significantly improved as compared with the conventional liquid crystal TV, and the luminance is 100 times or more. As described above, by setting the viewing angle to a narrow angle, the amount of light flux toward the monitoring direction can be concentrated, so that the utilization efficiency of light is significantly improved. As a result, even if a conventional liquid crystal display panel for TV is used, it is possible to realize a significant improvement in luminance with the same power consumption by controlling the light diffusion characteristics of the light source apparatus, and to provide a display apparatus suitable for an aerial floating image display apparatus for bright outdoor use.

Figure 20:
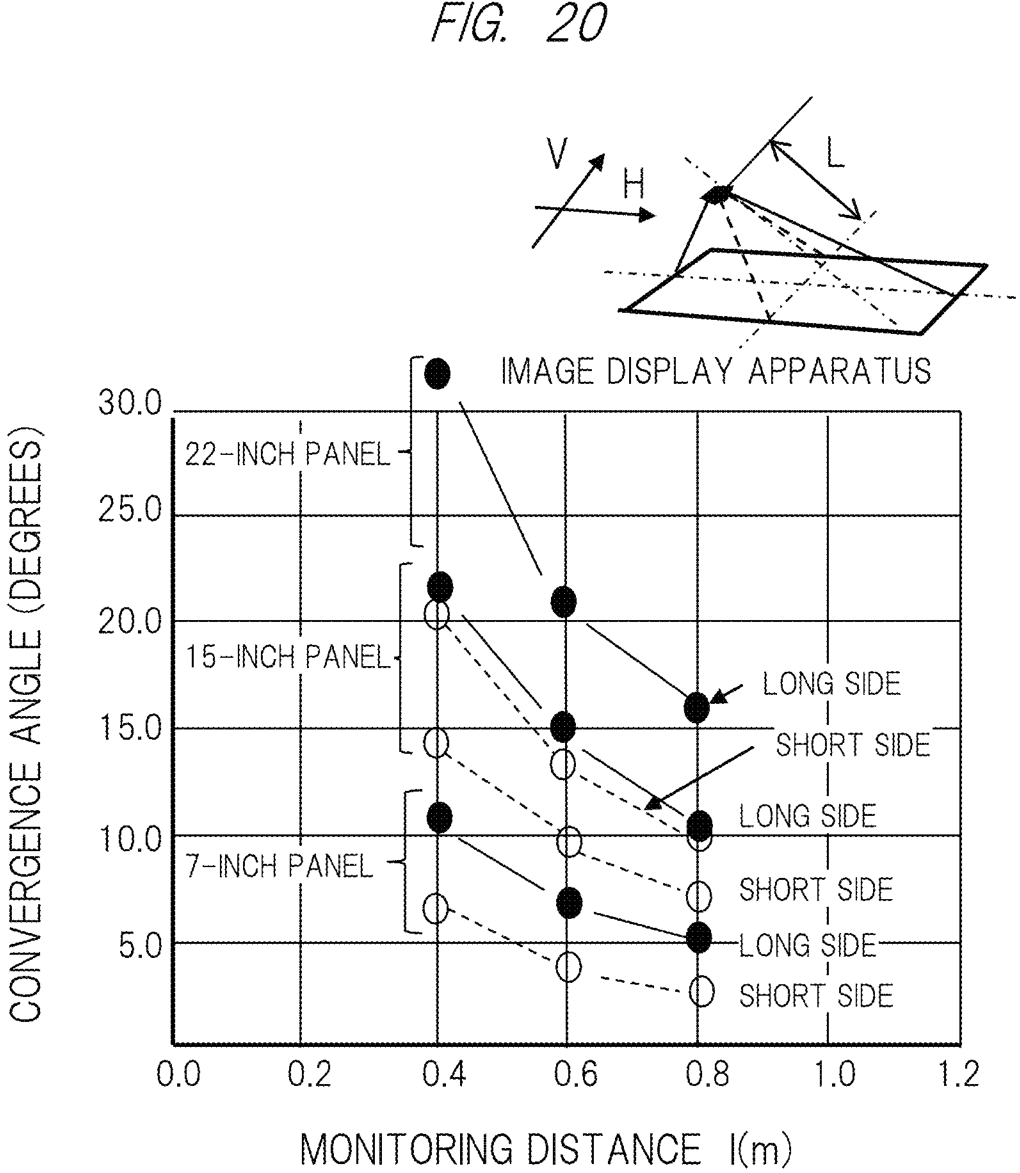
FIG. 20 is an explanatory diagram for describing light source diffusion characteristics of the display apparatus.

When a large-sized liquid crystal display panel is used, the overall brightness of the screen is improved by directing the light in the periphery of the screen inward, that is, toward the observer when the observer directly faces the center of the screen. FIG. 20 shows the convergence angle between the long side and the short side of the panel when the distance L from the observer to the panel and the panel size (screen ratio 16:10) are used as parameters. In the case of monitoring the screen as a vertically long screen, the convergence angle may be set in accordance with the short side. For example, in the case in which a 22-inch panel is used vertically and the monitoring distance is 0.8 m, the image light from the four corners of the screen can be effectively directed toward the observer by setting the convergence angle to 10 degrees.

Similarly, in the case in which a 15-inch panel used vertically is monitored and the monitoring distance is 0.8 m, the image light from the four corners of the screen can be effectively directed toward the observer by setting the convergence angle to 7 degrees. As described above, the overall brightness of the screen can be improved by adjusting the image light in the periphery of the screen so as to be directed to the observer located at the optimum position to monitor the center of the screen depending on the size of the liquid crystal display panel and whether the liquid crystal display panel is used vertically or horizontally.

As a basic configuration, as shown in FIG. 16, a light flux having narrow-angle directional characteristics is made to enter the liquid crystal display panel 11 by the light source apparatus, and the luminance is modulated in accordance with an image signal, whereby the aerial floating image obtained by reflecting the image information displayed on the screen of the liquid crystal display panel 11 by the retroreflector is displayed outdoors or indoors through the transparent member 100.

<Example of Light Source Apparatus (1)>

Subsequently, the configuration of the optical system of the light source apparatus or the like accommodated in the case will be described in detail with reference to FIG. 17, FIG. 18 (*a*), and FIG. 18 (*b*).

FIG. 17 and FIG. 18 show the LEDs 14*a* and 14*b* constituting the light source, and these LEDs are attached at predetermined positions with respect to LED collimators 15. Note that each of the LED collimators 15 is formed of, for example, a translucent resin such as acrylic. Further, as shown also in FIG. 18(*b*), the LED collimator 15 has a conical convex outer peripheral surface 156 obtained by rotating a parabolic cross section, and the top thereof has a concave portion 153 in which a convex portion (i.e., a convex lens surface) 157 is formed at its central portion. Also, the central portion of the flat surface portion thereof has a convex lens surface 154 protruding outward (or may be a concave lens surface recessed inward). Note that the paraboloid 156 that forms the conical outer peripheral surface of the LED collimator 15 is set within a range of an angle at which light emitted from the LEDs 14*a* and 14*b* in the peripheral direction can be totally reflected inside the paraboloid, or has a reflection surface formed thereon.

Also, each of the LEDs 14*a* and 14*b* is arranged at a predetermined position on the surface of the LED substrate 102 which is a circuit board for the LEDs. The LED substrate 102 is arranged and fixed to the LED collimator 15 such that each of the LEDs 14*a* and 14*b* on the surface thereof is located at the central portion of the concave portion 153 of the LED collimator 15.

With such a configuration, of the light emitted from the LED 14*a* or 14*b*, in particular, the light emitted upward (to the right in the drawing) from the central portion thereof is condensed into parallel light by the two convex lens surfaces 157 and 154 forming the outer shape of the LED collimator 15. Also, the light emitted from the other portion toward the peripheral direction is reflected by the paraboloid forming the conical outer peripheral surface of the LED collimator 15, and is similarly condensed into parallel light. In other words, with the LED collimator 15 having a convex lens formed at the central portion thereof and a paraboloid formed in the peripheral portion thereof, it is possible to extract substantially all of the light generated by the LED 14*a* or 14*b* as parallel light, and to improve the utilization efficiency of the generated light.

Note that a polarization conversion element 21 is provided on the light emission side of the LED collimator 15. As is apparent also from FIG. 18, the polarization conversion element 21 is configured by combining a columnar translucent member having a parallelogram cross section (hereinafter referred to as a parallelogram column) and a columnar translucent member having a triangular cross section (hereinafter referred to as a triangular column), and arranging a plurality of the combinations of the members in an array in parallel to a plane orthogonal to the optical axis of the parallel light from the LED collimator 15. Further, polarizing beam splitters (hereinafter abbreviated as "PBS films") 211 and reflective films 212 are alternately provided at the interface between the adjacent translucent members arranged in an array, and a λ/2 phase plate 213 is provided on the emission surface from which light that has entered the polarization conversion element 21 and has been transmitted through the PBS films 211 is emitted.

A rectangular synthetic diffusion block 16 shown also in FIG. 18(*a*) is further provided on the emission surface of the polarization conversion element 21. Namely, the light emitted from the LED 14*a* or 14*b* becomes parallel light by the action of the LED collimator 15 to enter the synthetic diffusion block 16, and reaches the light guide 17 after being diffused by textures 161 on the emission side.

The light guide 17 is a member made of, for example, a translucent resin such as acrylic and formed in a rod shape having a substantially triangular cross section (see FIG. 18 (*b*)), and as is apparent also from FIG. 17, the light guide 17 includes a light guide light incident portion (surface) 171 configured to face the emission surface of the synthetic diffusion block 16 with a first diffusion plate 18*a* interposed therebetween, a light guide light reflection portion (surface) 172 configured to form an inclined surface, and a light guide light emission portion (surface) 173 configured to face the liquid crystal display panel 11, which is a liquid crystal display element, with a second diffusion plate 18*b* interposed therebetween.

On the light guide light reflection portion (surface) 172 of the light guide 17, as shown also in FIG. 17 which is a partially enlarged view thereof, a large number of reflection surfaces 172*a* and connection surfaces 172*b* are alternately formed in a saw-tooth shape. Also, the reflection surface 172*a* (a line segment rising to the right in the drawing) forms αn (n: natural number, e.g., 1 to 130 in this example) with respect to the horizontal plane indicated by the dashed-and-dotted line in the drawing, and αn is here set to 43 degrees or less (however, 0 degrees or more) as an example.

The light guide light incident portion (surface) 171 is formed in a curved convex shape inclined toward the light source side. According to this, after the parallel light from the emission surface of the synthetic diffusion block 16 enters while being diffused through the first diffusion plate 18*a*, as is apparent also from the drawing, the light reaches the light guide light reflection portion (surface) 172 while being slightly bent (deflected) upward by the light guide light incident portion (surface) 171, and is reflected here to reach the liquid crystal display panel 11 provided on the emission surface on the upper side in the drawing.

With the display apparatus 1 described above in detail, it is possible to further improve the light utilization efficiency and its uniform illumination characteristics, and at the same time, it is possible to manufacture the display apparatus 1 including a modularized light source apparatus for S-polarized wave in a small size and at a low cost. Note that, in the above description, the polarization conversion element 21 is attached behind the LED collimator 15, but the present invention is not limited thereto, and the same function and effect can be obtained even by providing the polarization conversion element 21 in the optical path leading to the liquid crystal display panel 11.

Note that a large number of reflection surfaces 172*a* and connection surfaces 172*b* are alternately formed in a saw-tooth shape on the light guide light reflection portion (surface) 172, and the illumination light flux is totally reflected on each reflection surface 172*a* and directed upward. Further, since a narrow-angle diffusion plate is provided on the light guide light emission portion (surface) 173, the illumination light flux enters the light direction conversion panel 54 for controlling the directional characteristics as a substantially parallel diffused light flux, and then enters the liquid crystal display panel 11 from the oblique direction. In the present embodiment, the light direction conversion panel 54 is provided between the light guide light emission portion (surface) 173 and the liquid crystal display panel 11, but the same effect can be obtained even if the light direction conversion panel 54 is provided on the emission surface of the liquid crystal display panel 11.

<Example of Light Source Apparatus (2)>

Figure 19:
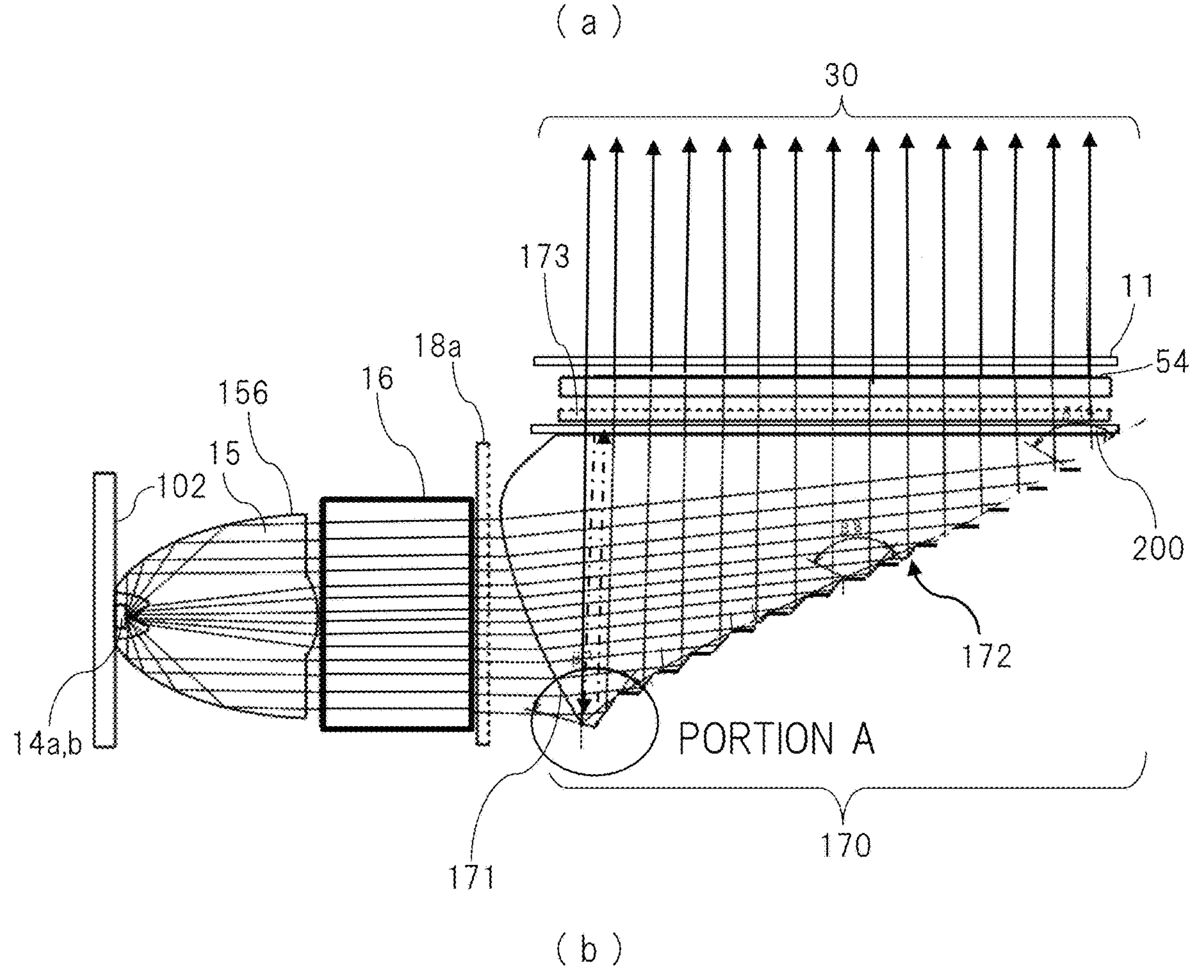
FIG. 19 is a cross-sectional view showing an example of a specific configuration of the light source apparatus.
Figure 19:
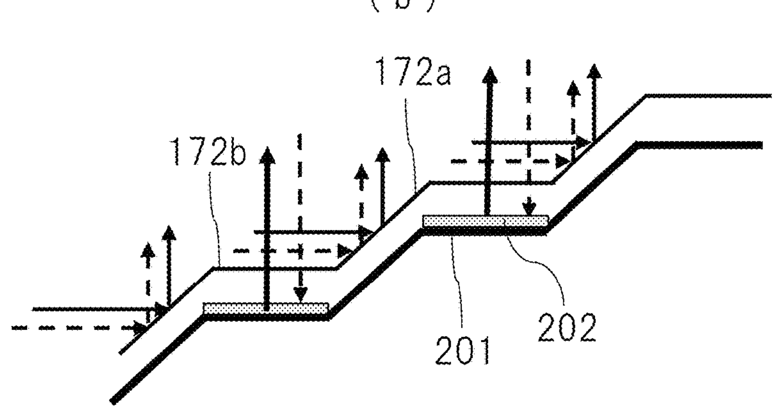

FIG. 19 shows another example of the configuration of the optical system of the light source apparatus 13 or the like. As in the example shown in FIG. 18, a plurality of (two in this example) LEDs 14*a* and 14*b* constituting the light source are shown, and these LEDs are attached at predetermined positions with respect to the LED collimators 15. Note that each of the LED collimators 15 is formed of, for example, a translucent resin such as acrylic. Further, as in the example shown in FIG. 18, the LED collimator 15 has a conical convex outer peripheral surface 156 obtained by rotating a parabolic cross section, and the top thereof has a concave portion 153 in which a convex portion (i.e., a convex lens surface) 157 is formed at its central portion. Also, the central portion of the flat surface portion thereof has a convex lens surface 154 protruding outward (or may be a concave lens surface recessed inward). Note that the paraboloid 156 that forms the conical outer peripheral surface of the LED collimator 15 is set within a range of an angle at which light emitted from the LED 14*a* in the peripheral direction can be totally reflected inside the paraboloid, or has a reflection surface formed thereon.

Also, each of the LEDs 14*a* and 14*b* is arranged at a predetermined position on the surface of the LED substrate 102 which is a circuit board for the LEDs. The LED substrate 102 is arranged and fixed to the LED collimator 15 such that each of the LEDs 14*a* and 14*b* on the surface thereof is located at the central portion of the concave portion 153 of the LED collimator 15.

With such a configuration, of the light emitted from the LED 14*a* or 14*b*, in particular, the light emitted upward (to the right in the drawing) from the central portion thereof is condensed into parallel light by the two convex lens surfaces 157 and 154 forming the outer shape of the LED collimator 15. Also, the light emitted from the other portion toward the peripheral direction is reflected by the paraboloid forming the conical outer peripheral surface of the LED collimator 15, and is similarly condensed into parallel light. In other words, with the LED collimator 15 having a convex lens formed at the central portion thereof and a paraboloid formed in the peripheral portion thereof, it is possible to extract substantially all of the light generated by the LED 14*a* or 14*b* as parallel light, and to improve the utilization efficiency of the generated light.

Note that a light guide 170 is provided on the light emission side of the LED collimator 15 with the first diffusion plate 18*a* interposed therebetween. The light guide 170 is a member made of, for example, a translucent resin such as acrylic and formed in a rod shape having a substantially triangular cross section (see FIG. 19 (*a*)), and as is apparent also from FIG. 19 (*a*), the light guide 170 includes the light guide light incident portion (surface) 171 configured to face the emission surface of the synthetic diffusion block 16 with the first diffusion plate 18*a* interposed therebetween, the light guide light reflection portion (surface) 172 configured to form an inclined surface, and the light guide light emission portion (surface) 173 configured to face the liquid crystal display panel 11, which is a liquid crystal display element, with a reflective polarizing plate 200 interposed therebetween.

For example, if the reflective polarizing plate 200 having the characteristics of reflecting P-polarized light (transmitting S-polarized light) is selected, the P-polarized light of the natural light emitted from the LED as a light source is reflected, the reflected light passes through a λ/4 plate 202 provided on the light guide light reflection portion 172 shown in FIG. 19(*b*) and is reflected again by a reflection surface 201, and is converted into S-polarized light by passing through the λ/4 plate 202 again, so that all the light fluxes entering the liquid crystal display panel 11 are unified into S-polarized light.

Similarly, if the reflective polarizing plate 200 having the characteristics of reflecting S-polarized light (transmitting P-polarized light) is selected, the S-polarized light of the natural light emitted from the LED as a light source is reflected, the reflected light passes through the λ/4 plate 202 provided on the light guide light reflection portion 172 shown in FIG. 19(*b*) and is reflected again by the reflection surface 201, and is converted into P-polarized light by passing through the λ/4 plate 202 again, so that all the light fluxes entering the liquid crystal display panel 11 are unified into P-polarized light. The polarization conversion can be realized also by the configuration described above.

<Example of Light Source Apparatus (3)>

Another example of the configuration of the optical system of the light source apparatus or the like will be described with reference to FIG. 16. In the third example, as shown in FIG. 16, a divergent light flux of natural light (a mixture of P-polarized light and S-polarized light) from the LED 102 is converted into a substantially parallel light flux by the collimator lens 18, and is reflected toward the liquid crystal display panel 11 by the reflective light guide 304. The reflected light enters a reflective polarizing plate 206 arranged between the liquid crystal display panel 11 and the reflective light guide 304. A specific polarized wave (e.g., an S-polarized wave) is reflected by the reflective polarizing plate 206, passes through a surface connecting the reflection surfaces of the light guide 304, is subjected to polarization conversion by passing through the phase plate (λ/4 wavelength plate) 270 twice by being reflected by the reflection plate 271 arranged to face the opposite surface of the light guide 304, passes through the light guide and the reflective polarizing plate, and then enters the liquid crystal display panel 11 to be modulated into image light. At this time, by matching the specific polarized wave and the polarization plane subjected to polarization conversion, the utilization efficiency of light becomes twice as high as usual, and the degree of polarization (extinction ratio) of the reflective polarizing plate is also multiplied with the extinction ratio of the entire system, so that the contrast ratio of the information display system is significantly improved by using the light source apparatus of the present embodiment.

As a result, the natural light from the LED is aligned with a specific polarized wave (e.g., a P-polarized wave). As in the above-described example, a plurality of LEDs constituting the light source are provided (however, only one LED is shown in FIG. 16 due to the vertical cross section), and these LEDs are attached at predetermined positions with respect to the LED collimators 18. Note that each of the LED collimators 18 is formed of, for example, a translucent resin such as acrylic or glass. Further, the LED collimator 18 has a conical convex outer peripheral surface obtained by rotating a parabolic cross section, and the top thereof has a concave portion in which a convex portion (i.e., a convex lens surface) is formed at its central portion. Also, the central portion of the flat surface portion thereof has a convex lens surface protruding outward (or may be a concave lens surface recessed inward). Note that the paraboloid that forms the conical outer peripheral surface of the LED collimator 18 is set within a range of an angle at which light emitted from the LED in the peripheral direction can be totally reflected inside the paraboloid, or has a reflection surface formed thereon.

Also, each of the LEDs is arranged at a predetermined position on the surface of the LED substrate 102 which is a circuit board for the LEDs. The LED substrate 102 is arranged and fixed to the LED collimator 18 such that each of the LEDs on the surface thereof is located at the central portion of the concave portion of the LED collimator 18.

With such a configuration, of the light emitted from the LED, in particular, the light emitted from the central portion thereof is condensed into parallel light by the two convex lens surfaces forming the outer shape of the LED collimator 18. Also, the light emitted from the other portion toward the peripheral direction is reflected by the paraboloid forming the conical outer peripheral surface of the LED collimator 18, and is similarly condensed into parallel light. In other words, with the LED collimator 18 having a convex lens formed at the central portion thereof and a paraboloid formed in the peripheral portion thereof, it is possible to extract substantially all of the light generated by the LED as parallel light, and to improve the utilization efficiency of the generated light.

<Example of Light Source Apparatus (4)>

Further, another example of the configuration of the optical system of the light source apparatus or the like will be described with reference to FIG. 25. Two optical sheets 207 for converting the diffusion characteristics in the vertical direction and the horizontal direction (not shown in the front and back direction of the drawing) of the drawing are provided on the light emission side of the LED collimator 18, and the light from the LED collimator 18 is made to enter between the two optical sheets 207 (diffusion sheets). When the optical sheet 207 is composed of one sheet, the vertical and horizontal diffusion characteristics are controlled by the fine shapes of the front surface and the back surface. Alternatively, a plurality of diffusion sheets may be used to share the function. By the front surface shape and the back surface shape of the optical sheet 207, the diffusion angle of the light from the LED collimator 18 in the vertical direction of the screen is matched to the width of the vertical surface of the reflection surface of the diffusion sheet, and the optimal design is preferably made in the horizontal direction with using the number of LEDs and the divergence angle from the LED substrate (optical element) 102 as design parameters such that the surface density of the light flux emitted from the liquid crystal display panel 11 is uniform. In other words, the diffusion characteristics are controlled by the surface shapes of the plurality of diffusion sheets instead of the light guide. In the present embodiment, the polarization conversion is performed in the same manner as in the example of the light source apparatus (3) described above. Alternatively, by providing the polarization conversion element 21 between the LED collimator 18 and the diffusion film 207, the light source light may be made to enter the diffusion sheet 207 after performing the polarization conversion.

Figure 25:
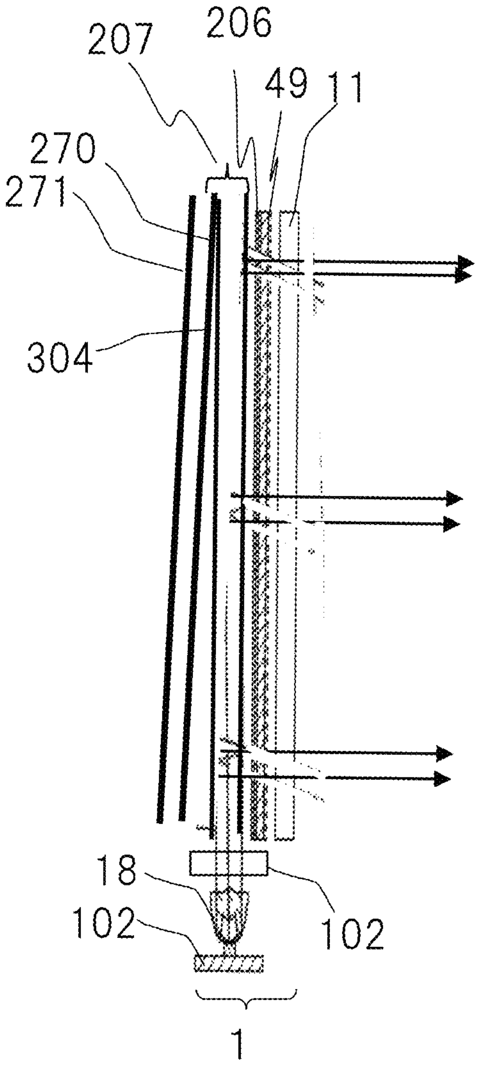
FIG. 25 is a cross-sectional view showing the configuration of the display apparatus according to an embodiment of the present invention.

If the above-described reflective polarizing plate 206 having the characteristics of reflecting S-polarized light (transmitting P-polarized light) is selected, the S-polarized light of the natural light emitted from the LED as a light source is reflected, passes through the retardation plate 270 shown in FIG. 25, is reflected by the reflection surface 271, is converted into P-polarized light by passing through the retardation plate 270 again, and then enters the liquid crystal display panel 11. It is necessary to select the optimum value for the thickness of the retardation plate in accordance with the incident angle of the light beam on the retardation plate, and the optimum value is present in the range from λ/16 to λ/4.

<Lenticular Lens>

In order to control the diffusion distribution of the image light from the liquid crystal display panel 11, the lens shape is optimized by providing a lenticular lens between the light source apparatus 13 and the liquid crystal display panel 11 or on the surface of the liquid crystal display panel 11, so that the emission characteristics in one direction can be controlled. Further, by arranging a microlens array in a matrix, the emission characteristics of the image light flux from the display apparatus 1 can be controlled in the X-axis and Y-axis directions, and as a result, it is possible to obtain an aerial floating image display apparatus having desired diffusion characteristics.

The function of the lenticular lens will be described. By optimizing the lens shape, the lenticular lens can efficiently obtain an aerial floating image by the transmission or reflection of the light emitted from the above-described display apparatus 1 at the transparent member 100. Namely, by providing a sheet for controlling the diffusion characteristics of the image light from the display apparatus 1 by combining two lenticular lenses or arranging a microlens array in a matrix, the luminance (relative luminance) of the image light in the X-axis and Y-axis directions can be controlled in accordance with the reflection angle (the vertical direction is 0 degrees) thereof. In the present embodiment, by such a lenticular lens, the luminance (relative luminance) of light by the reflection and diffusion is enhanced by making the luminance characteristics in the vertical direction steep and changing the balance of the directional characteristics in the vertical direction (positive and negative directions of the Y-axis) as compared with the conventional case as shown in FIG. 22(*b*), whereby the image light having a narrow diffusion angle (high straightness) and only a specific polarized component like the image light from the surface-emitting laser image source is obtained, and the aerial floating image by the retroreflection efficiently reaches the eyes of the observer while suppressing the ghost image that has been generated in the retroreflector in the case of using the conventional technique.

Further, with the above-described light source apparatus, directional characteristics with significantly narrower angle in both the X-axis direction and the Y-axis direction with respect to the diffusion characteristics of the light emitted from the general liquid crystal display panel (denoted as conventional in the drawings) shown in FIG. 22(*a*) and FIG. 22(*b*) are obtained, so that it is possible to realize a display apparatus that emits light of a specific polarized wave that emits an image light flux that is nearly parallel to a specific direction.

Figure 21:
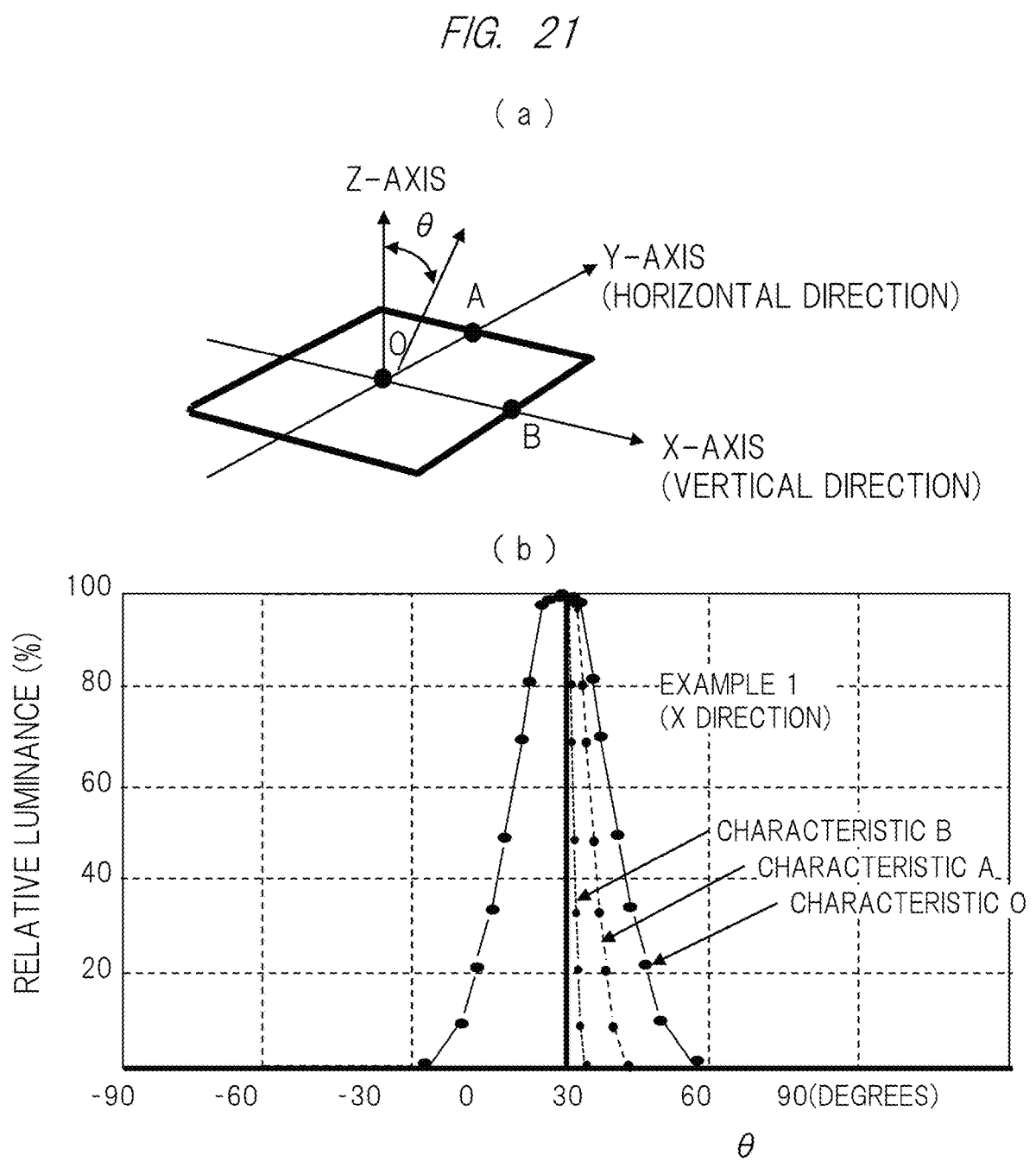

FIG. 21 shows an example of the characteristics of the lenticular lens adopted in the present embodiment. In this example, in particular, the characteristics in the X direction (vertical direction) are shown, and the characteristic O indicates a vertically symmetrical luminance characteristic in which the peak in the light emission direction is at an angle of around 30 degrees upward from the vertical direction (0 degrees). Further, the characteristics A and B in FIG. 21 each indicate an example of a characteristic in which image light above the peak luminance is condensed at around 30 degrees to increase the luminance (relative luminance). Therefore, in the characteristics A and B, the luminance (relative luminance) of light is sharply reduced at an angle exceeding 30 degrees as compared with the characteristic O.

Namely, in the optical system including the above-described lenticular lens, when the image light flux from the display apparatus 1 enters the retroreflector 2, the emission angle and the viewing angle of the image light aligned at a narrow angle can be controlled by the light source apparatus 13, and the degree of freedom of installation of the retroreflection sheet (retroreflector 2) can be significantly improved. As a result, it is possible to significantly improve the degree of freedom of the relationship of the imaging position of the aerial floating image which is imaged at a desired position by the reflection or the transmission at the transparent member 100. Consequently, the light having a narrow diffusion angle (high straightness) and having only a specific polarized component is obtained, and can efficiently reach the eyes of an observer outdoors or indoors. According to this, even if the intensity (luminance) of the image light from the display apparatus is reduced, the observer can accurately recognize the image light and obtain information. In other words, by reducing the output of the display apparatus, it is possible to realize an aerial floating image display apparatus with lower power consumption.

<Countermeasure Against Peeking of Touch Operation>

Figure 26:
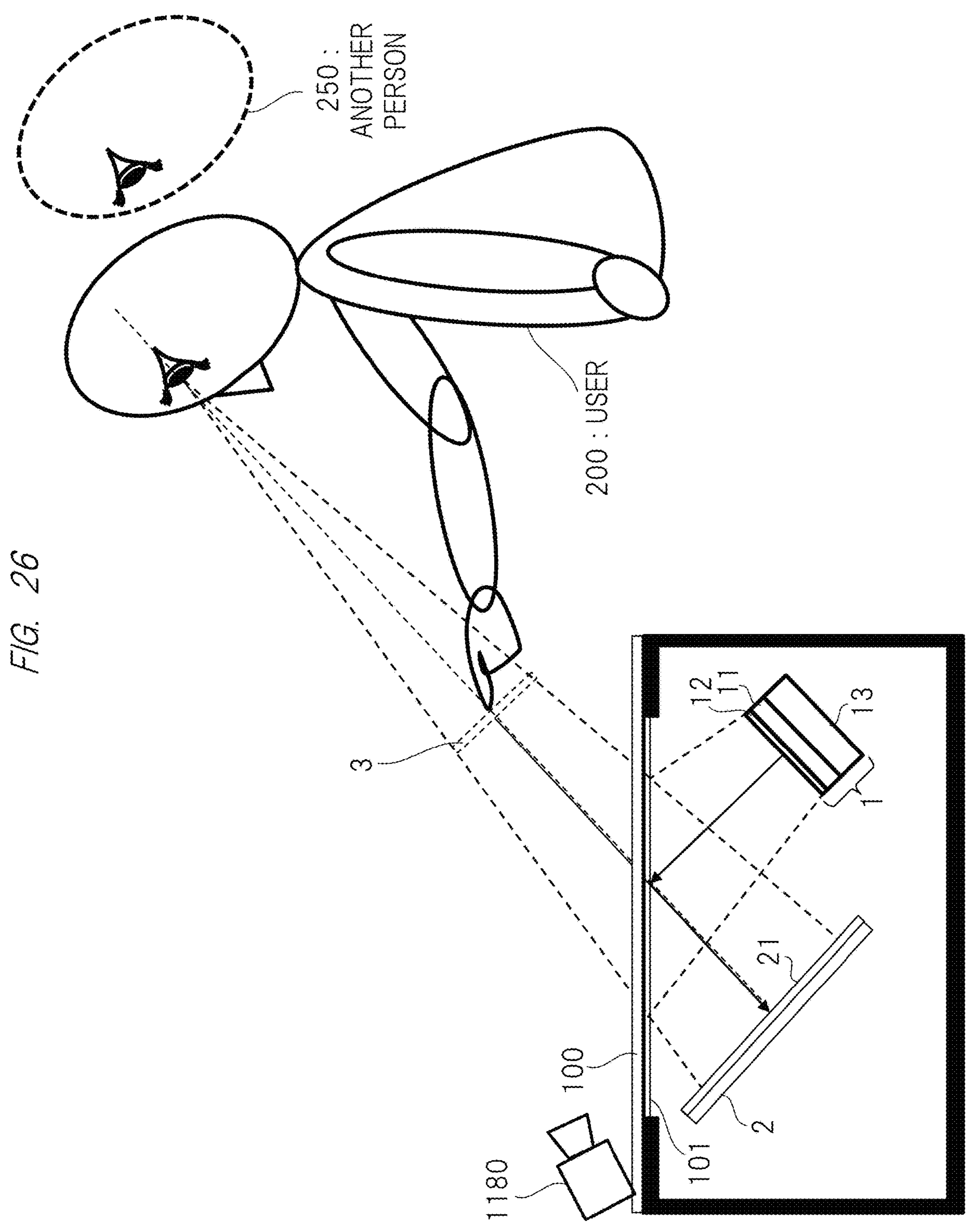
FIG. 26 is a diagram for describing a situation in which another person is standing behind a user.

FIG. 26 shows a case where the aerial floating image 3 is applied as a user interface of an ATM or the like of a bank, and is a diagram for describing a situation in which another person is standing behind a user 200 of the ATM or the like (hereinafter simply referred to as a user 200). FIG. 26 shows a situation in which another person 250 is standing behind the user 200, and another person 250 is peeking at the touch operation of the user 200. In this case, there is a fear that the operation of the user 200 is seen by another person 250 and important information such as a password is known to another person. Here, a countermeasure against peeking at the touch operation by another person 250 will be described.

Figure 27:
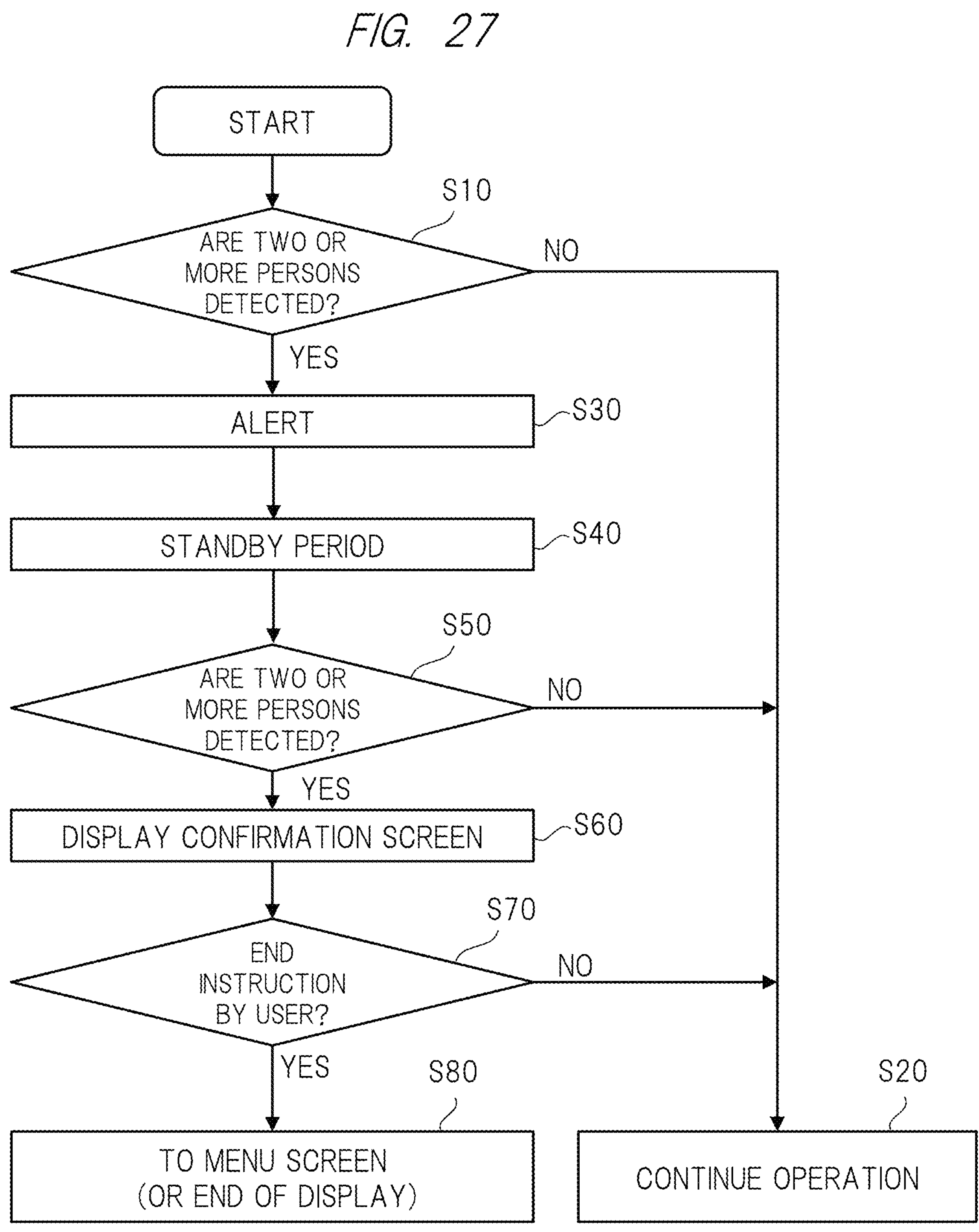
FIG. 27 is a flow diagram showing an example of a process performed when another person is standing behind a user.

FIG. 27 is a flow diagram showing an example of a process performed when another person is standing behind the user. FIG. 27 includes steps S10 to S80. In step S10, it is determined whether or not two or more persons appear in the captured image generated by the imager 1180. Namely, in step S10, it is determined whether or not another person is standing behind the user 200. For example, the controller 1110 performs image analysis processing on the captured image output from the imager 1180, extracts persons from the captured image, and detects the number of persons included in the captured image, thereby determining whether or not another person is standing behind the user 200.

If the number of persons included in the captured image is one, that is, only the user 200 appears in the captured image (NO), the controller 1110 determines that no one is standing behind the user 200, and the touch operation by the user 200 is continued (step S20). On the other hand, if the number of persons included in the captured image is two or more (YES), the controller 1110 determines that another person 250 is standing behind the user 200, and the flow proceeds to step S30.

Note that, even if it is determined in step S10 that another person 250 is not standing behind the user 200 and the touch operation is continued, the process of step S10 may be performed again to repeatedly determine whether or not another person 250 is standing behind the user 200.

Figure 28:
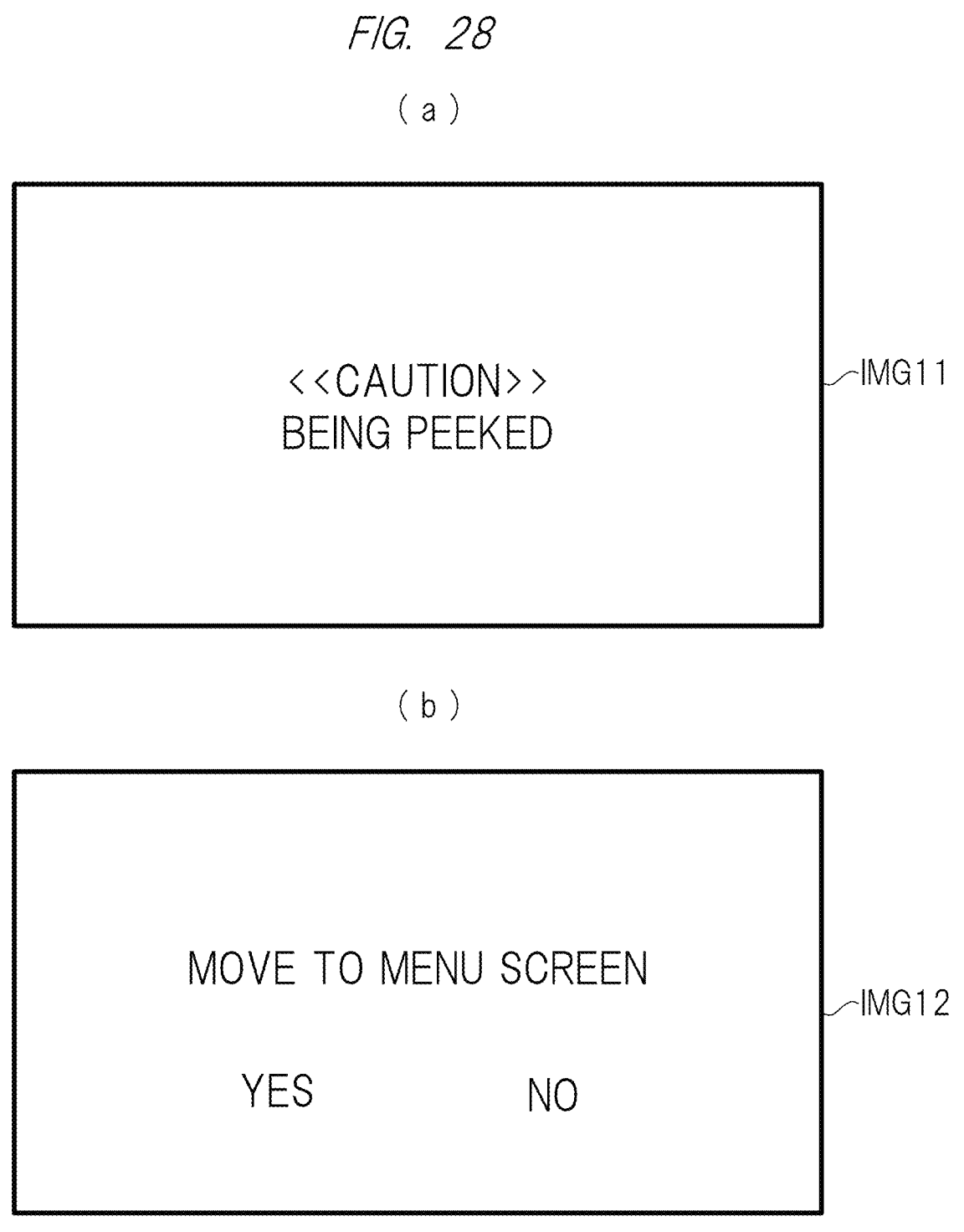

In step S30, based on the determination result in step S10, an alert is given to the user 200 by notifying that another person 250 is standing behind. FIG. 28 is a diagram showing examples of a display image for notifying the user when another person is standing behind the user. In step S30, for example, as shown in FIG. 28(*a*), a display image (alert image) IMG11 indicating that the touch operation is being peeked by another person 250 standing behind is displayed. The display image IMG11 may be displayed near the object on which the touch operation is performed, or may be displayed so as to be superimposed on the object. The control related to the display of the display image IMG11 is performed by, for example, the image controller 1160 based on an instruction from the controller 1110.

Note that the alert to the user 200 may be performed by audio. The alert by audio is performed by, for example, supplying audio data for alerting to the audio output unit 1140 in response to the instruction from the controller 1110.

When the alert to the user 200 is performed by the display image IMG11 and/or audio, the flow proceeds to step S40.

Step S40 is a standby period after the alert to the user 200 is performed. When a predetermined standby time elapses and the standby period ends, the flow proceeds to step S50. In step S50, the same process as in step S10 is performed, and it is determined whether or not another person 250 is standing behind the user 200.

In step S50, if only the user 200 appears in the captured image (NO), the controller 1110 determines that no one is standing behind the user 200, and the touch operation by the user 200 is continued (step S20). On the other hand, if the number of persons included in the captured image is two or more (YES), the controller 1110 determines that another person 250 is standing behind the user 200, and the flow proceeds to step S60.

In step S60, for example, a selection image IMG12 shown in FIG. 28(*b*) for allowing the user to select whether or not to move to the menu screen which is the initial screen is displayed. Note that, as the selection image, an image to select whether or not to end the screen display may be displayed.

In step S70, the user 200 selects whether or not to move to the menu screen with reference to the selection image IMG12. If not moving to the menu screen (NO), the user 200 selects "NO" in the selection image IMG12 to continue the touch operation.

On the other hand, if moving to the menu screen (YES), the user 200 selects "YES" in the selection image IMG12. Thereby, the display content is switched to the menu screen, and the touch operation ends (step S80).

With this configuration, it is possible to prevent another person 250 from peeking at the touch operation of the user 200 and to improve safety at the time of the touch operation.

<Case where No Operation Is Performed for Predetermined Time>

Figure 29:
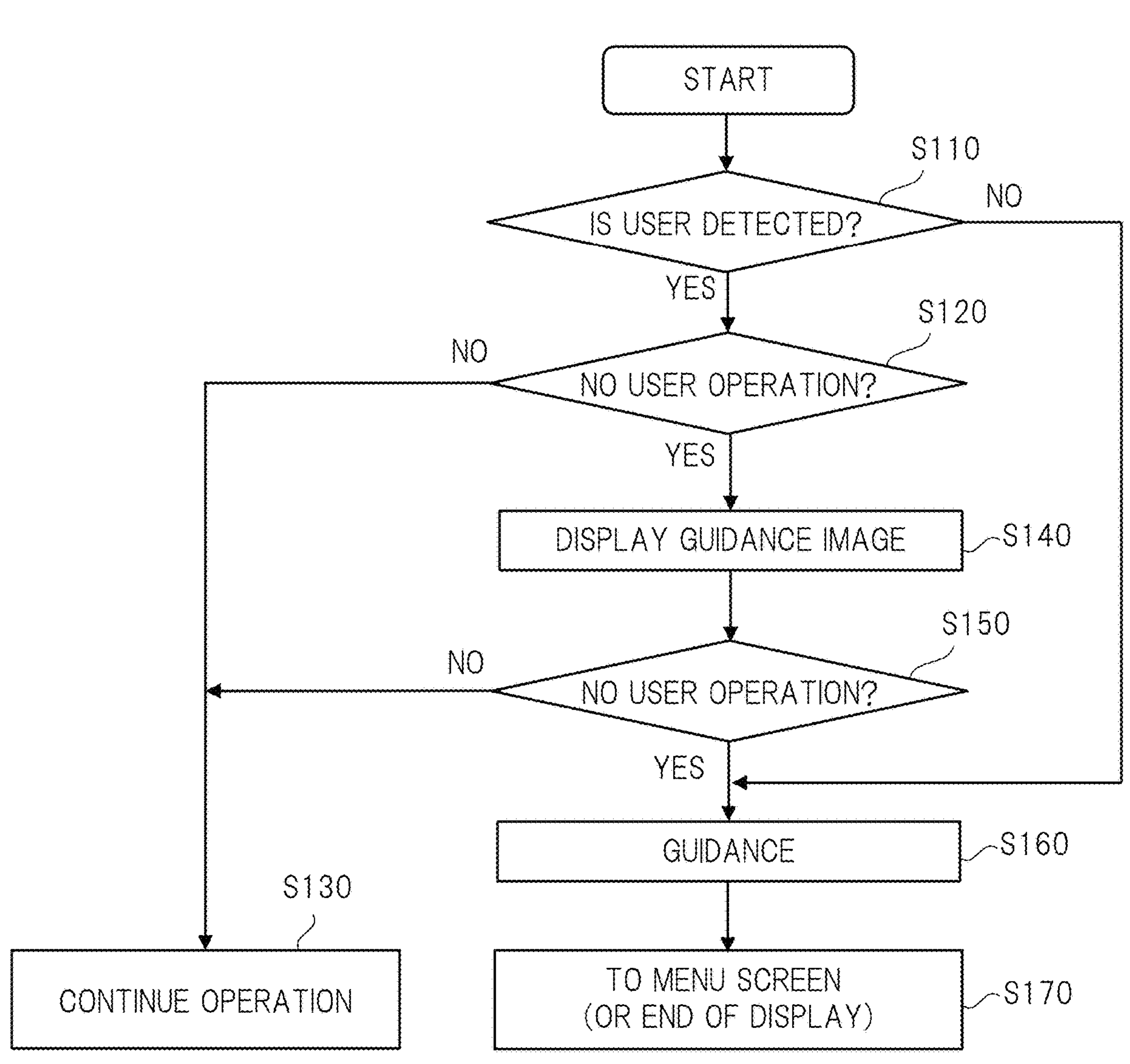
FIG. 29 is a flow diagram showing an example of a process performed when no operation is performed for a predetermined time.

Next, a process when the touch operation by the user 200 is not performed for a predetermined time will be described. FIG. 29 is a flow diagram showing an example of a process performed when no operation is performed for a predetermined time. FIG. 29 includes steps S110 to S170.

In step S110, the detection of the user 200 is performed. In step S110, as in step S10 in FIG. 27, for example, the detection of the user 200 is performed by image processing on the captured image. When the user 200 is detected in step S110 (YES), the flow proceeds to step S120.

In step S120, the presence or absence of a touch operation by the user 200 is detected. For example, the spatial operation detector 1350 acquires a sensing signal from the spatial operation detection sensor 1351, and detects the presence or absence of a touch operation based on the sensing signal. If it is determined in step S120 that there is a touch operation (NO), the operation by the user 200 is continued (step S130).

Figure 30:
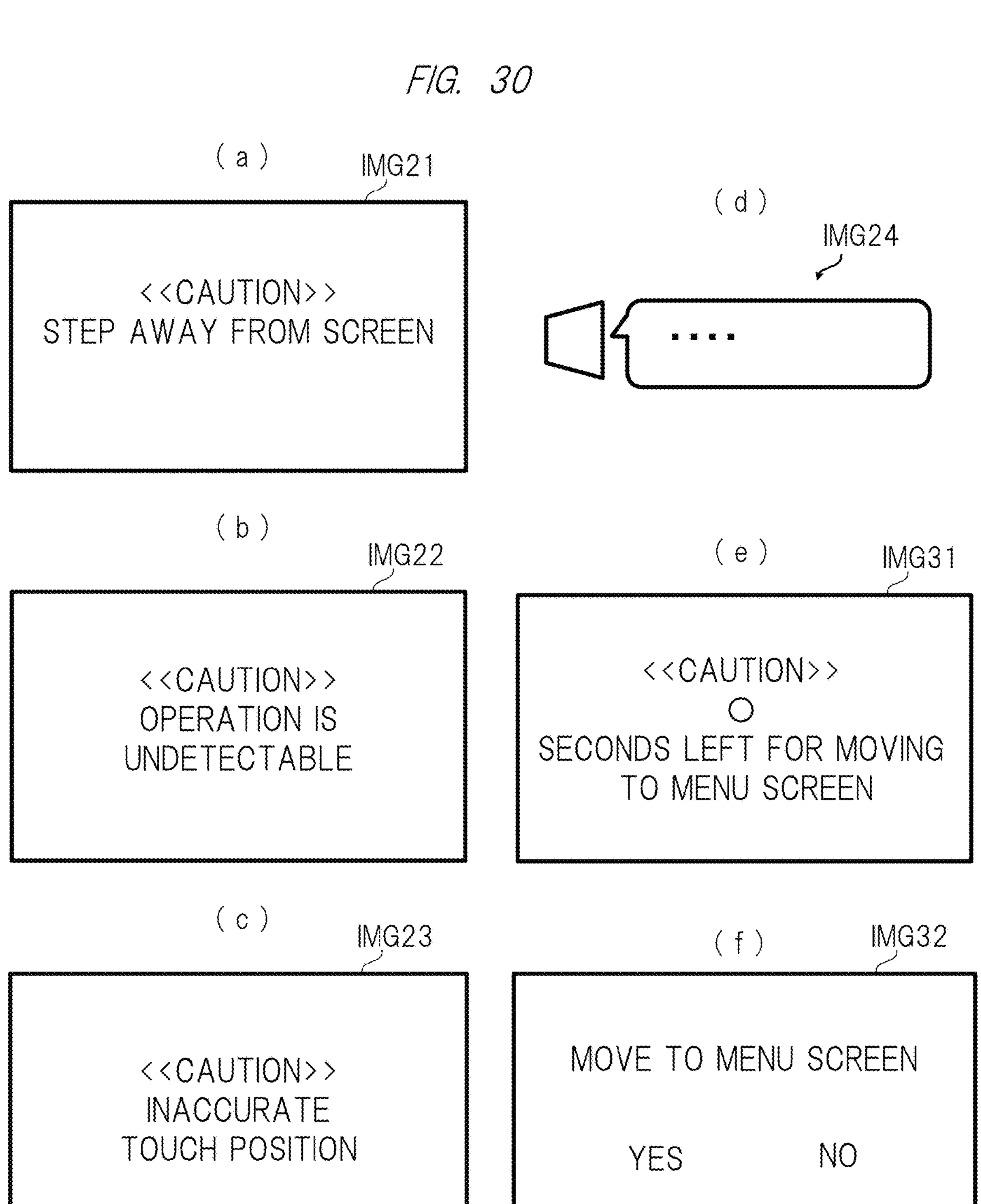
FIG. 30 is a diagram showing examples of a guidance image.

On the other hand, if it is determined in step S120 that there is no touch operation (YES), the flow proceeds to step S140, and a guidance image for notifying the user 200 of the operation status is displayed. FIG. 30 is a diagram showing examples of the guidance image. If there is no touch operation although the user 200 is identified, for example, a situation in which the user 200 is too close to the aerial floating image 3 or the display position (display surface) of the aerial floating image 3 and the finger position (operation position) of the user 200 do not match is assumed.

Therefore, for example, the spatial operation detector 1350 and the controller 1110 detect the finger position or the body position of the user 200 as a sensing result based on the sensing signal of the spatial operation detection sensor 1351. At this time, the finger position or the body position of the user 200 may be detected as a sensing result by combining the image processing result for the captured image and the sensing result. The detection of the sensing result may be performed in step S120, in step S140, or between steps S120 and S140.

If the finger or body of the user 200 bites into the display surface of the aerial floating image 3 and the touch operation cannot be detected, for example, a guidance image IMG21 for prompting the user 200 to step away from the display screen which is the aerial floating image 3 is displayed as shown in FIG. 30 (*a*).

The guidance image IMG21 may be displayed near the object on which the touch operation is performed, or may be displayed so as to be superimposed on the object. The control related to the display of the guidance image IMG21 is performed by, for example, the image controller 1160 based on an instruction from the controller 1110 and the spatial operation detector 1350. The same applies to guidance images described below.

Then, if the finger of the user 200 does not reach the display surface of the aerial floating image 3 and the touch operation cannot be detected, for example, a guidance image IMG22 for notifying the user 200 that the touch operation cannot be detected is displayed as shown in FIG. 30 (*b*). Note that the guidance image IMG22 may include a content for notifying that the finger of the user 200 does not reach the display surface of the aerial floating image 3 and prompting the user 200 to perform such an operation as moving the finger forward.

Then, if the finger of the user 200 reaches the display surface of the aerial floating image 3 but the touch operation cannot be detected because the object is not touched accurately, for example, a guidance image IMG23 for notifying the user 200 that the touch position is inaccurate is displayed as shown in FIG. 30 (*c*).

Note that the guidance to the user 200 may be performed by audio. The guidance by audio is performed by, for example, supplying audio data for guidance to the audio output unit 1140 in response to the instruction of the controller 1110. At this time, for example, an image (FIG. 30(*d*)) indicating that the guidance by audio is being performed may be displayed.

When the guidance to the user 200 is performed by the guidance image and/or audio, the flow proceeds to step S150.

In step S150, after the guidance is given to the user 200, the presence or absence of the touch operation by the user 200 is detected again. The process in step S150 is the same as that in step S120. If it is determined in step S150 that there is a touch operation (NO), the operation by the user 200 is continued (step S130).

On the other hand, if it is again determined also in step S150 that there is no touch operation (YES), the flow proceeds to step S160, and the guidance image for notifying the move to the menu screen is displayed. In step S160, a guidance image IMG31 for displaying the time left for the move to the menu screen, a guidance image IMG32 for allowing the user 200 to select whether or not to move to the menu screen, and the like are displayed as shown in FIG. 30 (*e*) and FIG. 30 (*f*).

When a predetermined time elapses or the move to the menu screen is selected, the menu screen is displayed (step S170). Note that, if it is selected not to move from the guidance image IMG32 to the menu image, for example, the process of step S110 or S120 may be performed again. Note that the guidance images IMG31 and IMG32 may be an image for displaying the time left for the end of the display and an image for allowing the user to select whether or not to end the display instead of the move to the menu screen.

In step S110, if the user 200 is not detected (NO), the flow proceeds to step S160, and the guidance image IMG31 for displaying the time left for the move to the menu screen is displayed, for example.

With this configuration, since guidance can be given to the user 200 based on the sensing result, it is possible to improve convenience.

<Stop of Reception of Touch Operation by User>

Next, a process of stopping reception of the touch operation by the user 200 will be described. For example, in a case where the user 200 is touching a plurality of objects at the same time and subsequent processing cannot be executed, the reception of the touch operation by the user 200 is stopped. In this case, for example, the flow is modified to proceed to step S140 also when the user 200 is touching a plurality of objects at the same time in step S120 in FIG. 29. More specifically, in step S140, a guidance image for notifying that a plurality of buttons are being simultaneously touched may be displayed, for example. Note that it is also possible to provide a step of determining whether or not a plurality of objects are being simultaneously touched between steps S120 and S130.

Then, in step S150, if a plurality of objects are being simultaneously touched, for example, an image like that in FIG. 30(*e*) is displayed to stop the reception of the touch operation by the user 200.

Also, for example, if a plurality of persons appear in the captured image, the reception of the operation by the user 200 may be stopped. In this case, for example, a step of determining whether or not another person is standing behind the user 200 like step S10 in FIG. 27 is provided between steps S110 and S120 in FIG. 29. Then, if it is determined that another person is standing behind the user 200, the flow proceeds to step S140, and an alert can be given to the user 200 by displaying a guidance image indicating that another person is peeking at the touch operation. Further, after step S140, a step of determining again whether or not another person is standing behind the user 200 is provided, and if it is determined also in this step that another person is peeking, the flow proceeds to step S150 to stop the reception of the touch operation by the user 200. Thereby, it is possible to prevent another person 250 from peeking at the touch operation.

Also, for example, if the aerial floating image 3 is not displayed at a brightness with which the user 200 can recognize the aerial floating image 3, the reception of the operation by the user 200 may be stopped. In this case, for example, an illuminance detection step of detecting the brightness of the surrounding environment using, for example, an illuminance sensor is provided before or after step S110 in FIG. 29. Further, after the illuminance detection step, a step of determining whether or not the user 200 can recognize the aerial floating image 3 by comparing the brightness of the surrounding environment with the luminance (brightness) of the displayed aerial floating image 3 is provided. Then, if it is determined in this determination step that the user 200 cannot recognize the aerial floating image 3, for example, the flow proceeds to step S160, and a guidance image for notifying that the screen moves to a menu screen because the aerial floating image 3 cannot be recognized may be displayed.

Further, for example, the reception of the operation by the user 200 may be stopped also when the temperature of the aerial floating image display apparatus rises to a predetermined threshold temperature or higher. In this case, for example, a step of measuring and determining the temperature of the aerial floating image display apparatus is provided before or after step S110 in FIG. 29, and if the temperature of the aerial floating image display apparatus is equal to or higher than a predetermined threshold, the flow proceeds to step S160, and a guidance image for notifying that the temperature of the aerial floating image display apparatus has increased and thus the screen will move to the menu screen may be displayed. In this case, the display of the aerial floating image 3 may be stopped without displaying the guidance image.

Note that it is also possible to perform the measurement and determination of the temperature of the aerial floating image display apparatus in a flow different from that in FIG. 27, and the guidance image may be displayed or the display of the aerial floating image 3 may be stopped by the interruption to the controller 1110 when the temperature of the aerial floating image display apparatus becomes equal to or higher than a predetermined threshold.

With this configuration, since guidance can be given to the user 200 in accordance with various situations, it is possible to improve convenience.

<Luminance Adjustment of Aerial Floating Image>

Next, the luminance adjustment of the aerial floating image 3 will be described. The aerial floating image 3 becomes difficult to see from the user 200 in some cases depending on the environment of the installation location of the aerial floating image display apparatus. For example, when the environment of the installation location is bright, the difference between the brightness of the aerial floating image 3 and the brightness of the surrounding environment becomes small, so that the aerial floating image 3 becomes difficult to see. In this case, the luminance of the aerial floating image 3 is adjusted such that the aerial floating image 3 is easily viewed.

The brightness of the surrounding environment is detected by, for example, an illuminance sensor. The illuminance sensor may be incorporated in the aerial floating image display apparatus, or may be connected as an external device to the aerial floating image display apparatus 1000 in a wired or wireless manner. The illuminance sensor detects the brightness of the surrounding environment and outputs the detected brightness to the aerial floating image display apparatus 1000 as illuminance sensing information. The illuminance sensing information input to the aerial floating image display apparatus 1000 is stored in, for example, the memory 1109.

Note that, when continuously recording illuminance sensing information, each illuminance sensing information may be recorded in, for example, the storage 1170. Each illuminance sensing information is recorded in the storage 1170 in association with each acquisition time.

The controller 1110 controls the power supply 1106 based on the illuminance sensing information, and adjusts the luminance (brightness) of the aerial floating image 3 by adjusting the power supplied from the power supply 1106 to the light source 1105. Note that the controller 1110 can calculate the luminance of the aerial floating image 3 based on the power supplied from the power supply 1106 to the light source 1105. Accordingly, the controller 1110 can adjust the luminance of the aerial floating image 3 by comparing the illuminance sensing information supplied from the illuminance sensor with the calculated luminance of the aerial floating image 3. Thus, it is possible to appropriately set the luminance of the aerial floating image 3.

Also, when it gets dark in the surrounding environment, the difference between the brightness of the aerial floating image 3 and the brightness of the surrounding environment becomes large, so that the user 200 feels that the aerial floating image 3 is dazzling. In this case, the controller 1110 performs control to reduce the luminance of the aerial floating image 3. Thereby, the luminance of the aerial floating image 3 can be appropriately set in accordance with the brightness of the surrounding environment, and the user 200 does not feel that the aerial floating image 3 is dazzling.

Next, a method of adjusting the luminance of the aerial floating image 3 in accordance with the time will be described. For example, when the aerial floating image display apparatus is continuously installed at a predetermined location for a long time, the brightness of the surrounding environment changes periodically. Therefore, the controller 1110 adjusts the luminance of the aerial floating image 3 for each time based on the periodic change in the brightness of the surrounding environment. The periodic change in the brightness of the surrounding environment, that is, the brightness of the surrounding environment for each time is measured in advance by using the illuminance sensor and is recorded in, for example, the storage 1170. With this configuration, it is possible to appropriately set the luminance of the aerial floating image 3 in accordance with the brightness of the surrounding environment.

Note that the luminance of the aerial floating image 3 may be adjusted by changing the aerial floating image 3. For example, if the difference between the brightness of the aerial floating image 3 and the brightness of the surrounding environment is small, the controller 1110 instructs the image controller 1160 to change the image to an image brighter than the currently displayed image. Based on the instruction from the controller 1110, the image controller 1160 outputs, for example, video data of a brighter image having the same display content such as an object related to the touch operation to the image display 1102. The image display 1102 displays the aerial floating image 3 which is brighter than the previous one based on the newly supplied video data.

On the other hand, when it gets dark in the surrounding environment and the difference between the brightness of the aerial floating image 3 and the brightness of the surrounding environment becomes large, the controller 1110 instructs the image controller 1160 to change the image to an image darker than the currently displayed image.

When adjusting the luminance of the aerial floating image 3 by changing the image, the control of the light source 1105 is not necessarily performed, or the control of the light source 1105 may be performed together with the change of the image.

<Automatic Display of Aerial Floating Image>

Figure 31:
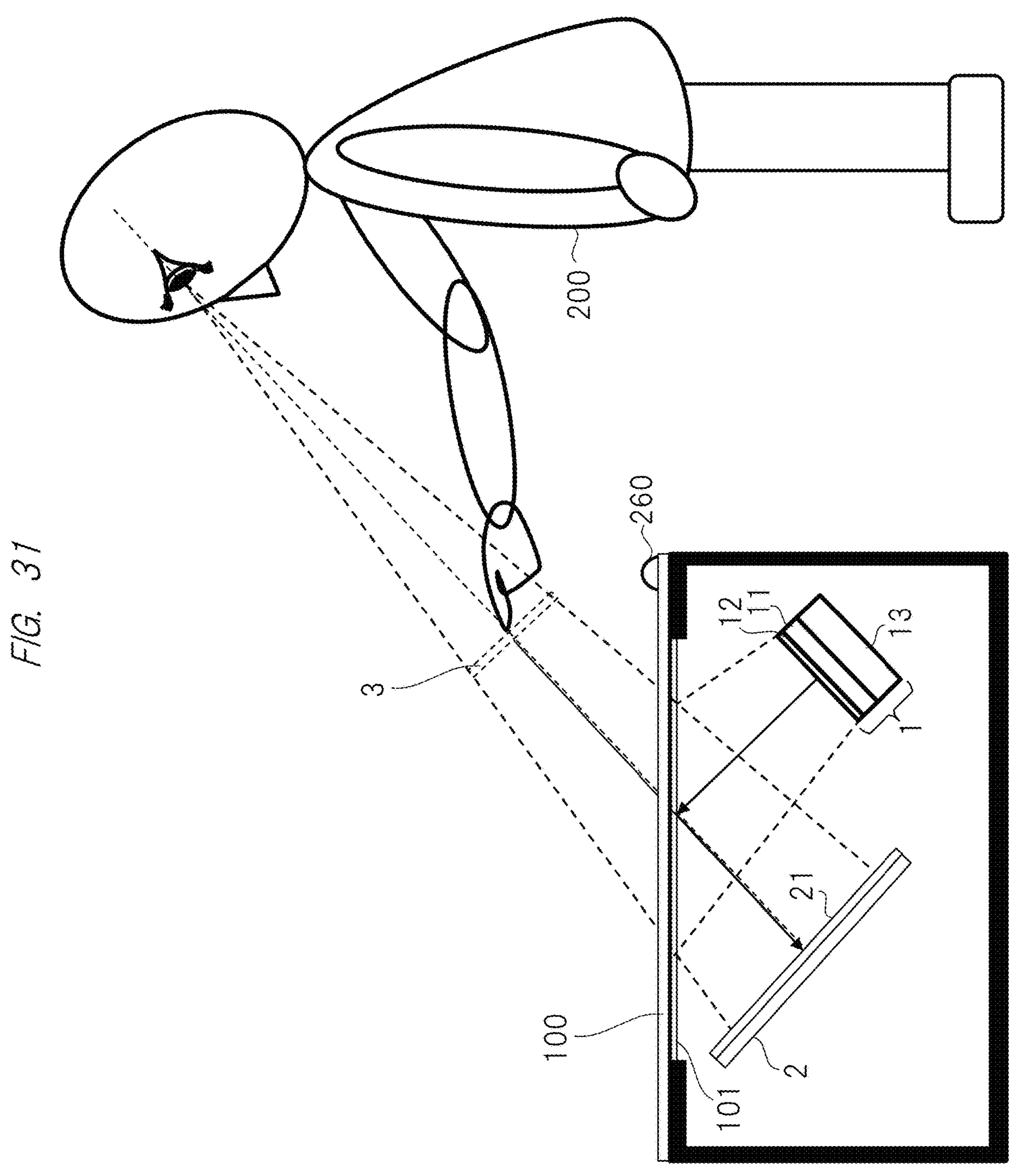
FIG. 31 is a diagram showing a configuration example of an aerial floating image display apparatus configured to perform automatic display of an aerial floating image.

Next, automatic display of an aerial floating image will be described. FIG. 31 is a diagram showing a configuration example of an aerial floating image display apparatus configured to perform automatic display of an aerial floating image. The aerial floating image display apparatus in FIG. 31 is provided with a human sensor 260. The human sensor 260 is, for example, a sensor configured to detect a person by using infrared light, visible light, or an ultrasonic wave. A temperature sensor or the like configured to detect the temperature of the display region of the aerial floating image 3 can also be used as the human sensor. For example, the human sensor 260 is connected to the aerial floating image display apparatus 1000 in a wired or wireless manner, and outputs a human sensing signal to the aerial floating image display apparatus 1000.

When the user 200 approaches the aerial floating image display apparatus 1000, the human sensor 260 outputs a human sensing signal. For example, the controller 1110 instructs the image controller 1160 to display the aerial floating image 3 based on the human sensing signal. Based on an instruction from the controller 1110, the image controller 1160 outputs video data for image display to the image display 1102. Thus, the aerial floating image 3 is displayed when a person approaches.

FIG. 32 is a diagram showing an image displayed as an aerial floating image as described above. For example, FIG. 32 shows a keypad for entering numbers and calculation formulas. The transparent structural member 60 shown in FIG. 32(*b*) is provided to facilitate for the observer to recognize the position of the aerial floating image 3.

Note that the image displayed as the aerial floating image is not limited thereto, and may be, for example, a keyboard used in a personal computer or the like or a selection button for selecting a product or the like.

With this configuration, the user 200 is notified of activation, and can immediately start the touch operation. Thus, it is possible to improve the convenience of the user 200 and reduce the power consumption.

In the foregoing, various embodiments have been described in detail, but the present invention is not limited only to the above-described embodiments, and includes various modifications. For example, in the above-described embodiments, the entire system has been described in detail so as to make the present invention easily understood, and the present invention is not necessarily limited to that including all the configurations described above. Also, part of the configuration of one embodiment may be replaced with the configuration of another embodiment, and the configuration of one embodiment may be added to the configuration of another embodiment. Furthermore, another configuration may be added to part of the configuration of each embodiment, and part of the configuration of each embodiment may be eliminated or replaced with another configuration.

REFERENCE SIGNS LIST

1 DISPLAY APPARATUS
2 RETROREFLECTOR
3 AERIAL IMAGE (AERIAL FLOATING IMAGE)
105 WINDOW GLASS
100 TRANSPARENT MEMBER
101 POLARIZATION SEPARATOR
12 ABSORPTIVE POLARIZING PLATE
13 LIGHT SOURCE APPARATUS
54 LIGHT DIRECTION CONVERSION PANEL
151 RETROREFLECTOR
102, 202 LED SUBSTRATE
203 LIGHT GUIDE
205, 271 REFLECTION SHEET
206, 270 RETARDATION PLATE
300 AERIAL FLOATING IMAGE
301 GHOST IMAGE OF AERIAL FLOATING IMAGE
302 GHOST IMAGE OF AERIAL FLOATING IMAGE
200 USER
250 ANOTHER PERSON
260 HUMAN SENSOR
1000 AERIAL FLOATING IMAGE DISPLAY APPARATUS
1110 CONTROLLER
1160 IMAGE CONTROLLER
1180 IMAGER
1102 IMAGE DISPLAY
1350 SPATIAL OPERATION DETECTOR
1351 SPATIAL OPERATION DETECTION SENSOR

The invention claimed is:

1. An aerial floating image display apparatus comprising:
a display apparatus configured to generate an image;
a retroreflector configured to reflect image light from the display apparatus to form an aerial floating image; and
an imager placed on a far side of the aerial floating image relative to a user of the aerial floating image display apparatus and on an opposite side of the aerial floating image relative to the user, and configured to capture an image of the user from a back side of the aerial floating image and having an imaging area overlapping with a position of an optical image of the aerial floating image,
wherein, if a plurality of persons appear in a captured image captured from the back side of the aerial floating image by the imager placed on the far side of the aerial floating image relative to the user, the aerial floating image display apparatus displays information for notifying the user of being peeked by including the information in the aerial floating image, and wherein generating the captured image by the imager is performed without passing through any optical elements disposed in an optical path of image light from the display apparatus to the aerial floating image.

2. The aerial floating image display apparatus according to claim 1, wherein, if a plurality of persons appear in a captured image after the information is displayed, the aerial floating image display apparatus displays, as the aerial floating image, information for allowing the user to select whether or not to move to a menu screen.

3. The aerial floating image display apparatus according to claim 2, wherein, if the user selects not to move to the menu screen, an operation by the user on the aerial floating image is continued.

4. The aerial floating image display apparatus according to claim 1, comprising:

a spatial operation detection sensor configured to detect an operation by the user on the aerial floating image, wherein, if the aerial floating image display apparatus detects the user based on the captured image and the spatial operation detection sensor does not detect the operation of the user, the aerial floating image display apparatus displays, as the aerial floating image, guidance information for notifying the user of an operation status.

5. The aerial floating image display apparatus according to claim 4, wherein, if the operation by the user is not detected after the guidance information is displayed, the aerial floating image display apparatus displays, as the aerial floating image, guidance information for allowing the user to select whether or not to move to a menu screen.

6. The aerial floating image display apparatus according to claim 4, wherein, if the user is simultaneously touching a plurality of objects included in the aerial floating image, reception of the operation by the user is stopped.

7. The aerial floating image display apparatus according to claim 4, wherein, if a plurality of persons appear in the captured image, reception of the operation by the user is stopped.

8. The aerial floating image display apparatus according to claim 4, wherein, if the aerial floating image is not displayed at a brightness with which the user can recognize the aerial floating image, reception of the operation by the user is stopped.

9. The aerial floating image display apparatus according to claim 4, wherein, if a temperature of the aerial floating image display apparatus rises to a predetermined threshold temperature or higher, reception of the operation by the user is stopped.

10. The aerial floating image display apparatus according to claim 1, comprising:

an illuminance sensor configured to detect a brightness of a surrounding environment, wherein the aerial floating image display apparatus adjusts luminance of an aerial floating image based on the brightness of the surrounding environment detected by the illuminance sensor.

11. The aerial floating image display apparatus according to claim 1, comprising:

a human sensor configured to detect a person, wherein the aerial floating image display apparatus starts displaying an aerial floating image when the human sensor has detected a person.

12. An aerial floating image display apparatus comprising:

a display apparatus configured to generate an image;

a retroreflector configured to reflect image light from the display apparatus to form an aerial floating image; and an imager placed on an opposite side of the aerial floating image relative to the user, and configured to capture an image of the user from a back side of the aerial floating image and having an imaging area overlapping with a position of an optical image of the aerial floating image, wherein, if another person in addition to the user appears in a captured image captured from the back side of the aerial floating image by the imager, the aerial floating image display apparatus displays information for notifying the user of the presence of the another person by including the information in the aerial floating image, and wherein generating the captured image by the imager is performed without passing through any optical elements disposed in an optical path of image light from the display apparatus to the aerial floating image.

13. The aerial floating image display apparatus according to claim 12, wherein the information indicates that an operation by the user can be peeked at by the another person.

14. The aerial floating image display apparatus according to claim 12, wherein, if the another person in addition to the user appears in the captured image, the aerial floating image display apparatus displays information for allowing the user to select whether or not to move to a menu screen.

15. The aerial floating image display apparatus according to claim 14, wherein, if the user selects not to move to the menu screen, an operation by the user on the aerial floating image is continued.

16. The aerial floating image display apparatus according to claim 12, comprising:

a spatial operation detection sensor configured to detect an operation by the user on the aerial floating image, wherein, if the aerial floating image display apparatus detects the user based on the captured image and the spatial operation detection sensor does not detect the operation of the user, the aerial floating image display apparatus displays, as the aerial floating image, guidance information for notifying the user of an operation status.

17. The aerial floating image display apparatus according to claim 16, wherein, if the operation by the user is not detected after the guidance information is displayed, the aerial floating image display apparatus displays guidance information for allowing the user to select whether or not to move to a menu screen.

18. The aerial floating image display apparatus according to claim 16, wherein, if the user is simultaneously touching a plurality of objects included in the aerial floating image, reception of the operation by the user is stopped.

19. The aerial floating image display apparatus according to claim 16, wherein, if the another person in addition to the user appears in the captured image, reception of the operation by the user is stopped.

20. The aerial floating image display apparatus according to claim 16, wherein, if the aerial floating image is not displayed at a brightness with which the user can recognize the aerial floating image, reception of the operation by the user is stopped.

* * * * *